(12) United States Patent
Bickford et al.

(10) Patent No.: US 12,305,388 B2
(45) Date of Patent: May 20, 2025

(54) CAP FOR A TEMPORARY WALL SYSTEM PROVIDING FIRE BARRIER PROTECTION

(71) Applicant: STARC SYSTEMS, INC., Brunswick, ME (US)

(72) Inventors: Bruce Bickford, Cushing, ME (US); Darrell Flagg, Turner, ME (US); William Randall, Brunswick, ME (US); Amelia Cutler, Scarborough, ME (US)

(73) Assignee: STARC SYSTEMS, INC., Brunswick, ME (US)

( * ) Notice: Subject to any disclaimer, the term of this patent is extended or adjusted under 35 U.S.C. 154(b) by 304 days.

(21) Appl. No.: 18/097,773

(22) Filed: Jan. 17, 2023

(65) Prior Publication Data
US 2024/0018777 A1    Jan. 18, 2024

Related U.S. Application Data

(60) Provisional application No. 63/389,461, filed on Jul. 15, 2022.

(51) Int. Cl.
| | |
|---|---|
| *E04B 2/82* | (2006.01) |
| *E04B 2/74* | (2006.01) |
| *E04G 21/24* | (2006.01) |

(52) U.S. Cl.
CPC ............ *E04B 2/821* (2013.01); *E04B 2/7403* (2013.01); *E04G 21/243* (2013.01)

(58) Field of Classification Search
CPC .... E04B 2/7403; E04B 2/821; E04B 1/34321; E04G 21/243; E04F 15/10; E04F 2201/02; F25D 23/063

USPC .............. 52/591.4, 591.5, 79.1, 243.1, 582.2
See application file for complete search history.

(56) References Cited

U.S. PATENT DOCUMENTS

| | | | | |
|---|---|---|---|---|
| 368,387 | A | * | 8/1887 | Donaldson ............... E04B 2/02 52/541 |
| 2,855,037 | A | | 10/1958 | Stiffel |
| 3,593,474 | A | | 7/1971 | Neels |
| 3,596,701 | A | | 8/1971 | Cowan |
| 3,685,223 | A | | 8/1972 | Sherwood |
| 3,729,889 | A | * | 5/1973 | Baruzzini ............. F25D 23/063 D25/1 |
| 3,897,668 | A | | 8/1975 | McDonnell |
| 3,913,292 | A | * | 10/1975 | Braekkan .................. E04B 9/04 52/406.1 |
| 4,144,924 | A | | 3/1979 | Vanden Hoek |
| 4,236,366 | A | | 12/1980 | Rijnders |
| 4,245,442 | A | | 1/1981 | Durham |
| 4,277,920 | A | | 7/1981 | Dixon |

(Continued)

*Primary Examiner* — Paola Agudelo
(74) *Attorney, Agent, or Firm* — Crowe & Dunlevy LLC

(57) ABSTRACT

A barrier system for partitioning a space includes wall panels which interlock with each other to provide a modular wall that is fire rated. The interlocking panels are assembled in the barrier in columns using a first tongue and groove assembly and a panel lock using a strike and latch supported by the tongue member and groove member, respectively. The barrier system further includes cap panel which adjoin each at a joint to provide a modular ceiling that is fire rated. The cap panels are assembled in the barrier to corresponding wall panels using a second tongue and groove assembly and a panel lock using a strike and latch supported by the tongue member and groove member, respectively.

22 Claims, 20 Drawing Sheets

(56) References Cited

U.S. PATENT DOCUMENTS

| | | | |
|---|---|---|---|
| 4,535,577 A | 8/1985 | Tenser et al. | |
| 4,546,889 A | 10/1985 | Schoumaker et al. | |
| 4,706,551 A | 11/1987 | Schofield | |
| 4,731,961 A | 3/1988 | Bona | |
| 4,833,840 A | 5/1989 | Kalischewski et al. | |
| 5,054,255 A | 10/1991 | Maninfior | |
| 5,088,511 A | 2/1992 | Bain | |
| 5,125,202 A | 6/1992 | Kissinger | |
| 5,373,678 A | 12/1994 | Hesser | |
| 5,433,046 A | 7/1995 | MacQuarrie et al. | |
| 5,457,922 A | 10/1995 | Fara | |
| 5,475,960 A | 12/1995 | Lindal | |
| 5,509,242 A | 4/1996 | Rechsteiner et al. | |
| 5,685,112 A | 11/1997 | Fara | |
| 5,803,653 A | 9/1998 | Zuffetti | |
| 5,816,001 A | 10/1998 | Goodman et al. | |
| 5,836,123 A * | 11/1998 | Gulino | E04F 13/18 52/591.4 |
| 5,924,469 A | 7/1999 | Whittemore | |
| 6,122,879 A | 9/2000 | Montes | |
| 6,171,705 B1 | 1/2001 | Clifford | |
| 6,266,939 B1 | 7/2001 | Yates et al. | |
| 6,383,242 B1 | 5/2002 | Rogers et al. | |
| 6,435,253 B1 | 8/2002 | Steeves et al. | |
| 6,494,013 B2 * | 12/2002 | Winskye | E04B 1/24 52/592.1 |
| 6,578,334 B2 * | 6/2003 | Watanabe | E04F 13/147 52/592.1 |
| 6,662,502 B2 | 12/2003 | Janutta et al. | |
| 6,729,085 B2 | 5/2004 | Newhouse et al. | |
| 7,188,636 B1 | 3/2007 | Kanne et al. | |
| 7,461,484 B2 | 12/2008 | Battey et al. | |
| 7,810,771 B1 | 10/2010 | Akers et al. | |
| 8,046,957 B2 | 11/2011 | Towersey et al. | |
| 8,074,700 B1 | 12/2011 | Melino et al. | |
| 8,161,706 B2 * | 4/2012 | Gingras | E04B 1/34321 52/582.1 |
| 8,181,404 B2 | 5/2012 | Klein | |
| 8,689,932 B2 * | 4/2014 | Dupont | F16M 7/00 181/200 |
| 8,839,592 B2 | 9/2014 | Foran | |
| 8,875,772 B1 | 11/2014 | Dixon, Jr. | |
| 8,875,774 B1 | 11/2014 | Flores | |
| 8,915,033 B2 | 12/2014 | Daniels et al. | |
| 9,151,045 B2 * | 10/2015 | Huang | E04B 2/7401 |
| 10,036,157 B2 | 7/2018 | Segall | |
| 10,041,249 B1 * | 8/2018 | Hebert | E04G 21/243 |
| 10,072,411 B1 | 9/2018 | Moran et al. | |
| 10,246,873 B1 | 4/2019 | Costanza | |
| 10,287,770 B2 | 5/2019 | Hodson et al. | |
| 10,329,759 B2 | 6/2019 | Feldpausch et al. | |
| 10,557,262 B2 | 2/2020 | Moran et al. | |
| 10,774,527 B2 | 9/2020 | Harber et al. | |
| 10,775,072 B2 | 9/2020 | Duchet et al. | |
| 11,680,403 B2 * | 6/2023 | Perez | E04C 2/46 52/302.3 |
| 2002/0148178 A1 | 10/2002 | Farag | |
| 2002/0152703 A1 | 10/2002 | Dunks | |
| 2003/0024189 A1 | 2/2003 | Hughes et al. | |
| 2004/0065799 A1 | 4/2004 | Whittemore et al. | |
| 2006/0137293 A1 * | 6/2006 | Klein | E04B 2/7411 52/782.1 |
| 2006/0283562 A1 | 12/2006 | Hickey | |
| 2008/0271402 A1 * | 11/2008 | Gingras | E04B 1/34321 29/897.32 |
| 2009/0020242 A1 | 1/2009 | Muhlebach | |
| 2009/0133354 A1 | 5/2009 | Spear et al. | |
| 2009/0307990 A1 | 12/2009 | Muehlebach | |
| 2010/0058688 A1 | 3/2010 | Goddard | |
| 2011/0078960 A1 | 4/2011 | Luttmann | |
| 2011/0138719 A1 | 6/2011 | Gosling et al. | |
| 2011/0162293 A1 | 7/2011 | Levy et al. | |
| 2012/0006498 A1 | 1/2012 | Potter | |
| 2012/0144763 A1 * | 6/2012 | Antonic | E04F 13/007 52/302.1 |
| 2012/0167371 A1 | 7/2012 | Mateu Climent | |
| 2013/0019541 A1 * | 1/2013 | Lin | E04B 1/34321 52/580 |
| 2014/0033642 A1 | 2/2014 | Foran | |
| 2014/0075851 A1 | 3/2014 | Rhines et al. | |
| 2020/0096251 A1 * | 3/2020 | Costanza | E04B 1/6125 |
| 2021/0238845 A1 * | 8/2021 | Bickford | B32B 9/041 |
| 2021/0285214 A1 * | 9/2021 | Moses | E04C 2/288 |
| 2021/0333042 A1 | 10/2021 | Gingras | |
| 2021/0395994 A1 | 12/2021 | Kolisnek | |
| 2022/0178138 A1 * | 6/2022 | Bickford | E04B 2/7448 |

\* cited by examiner

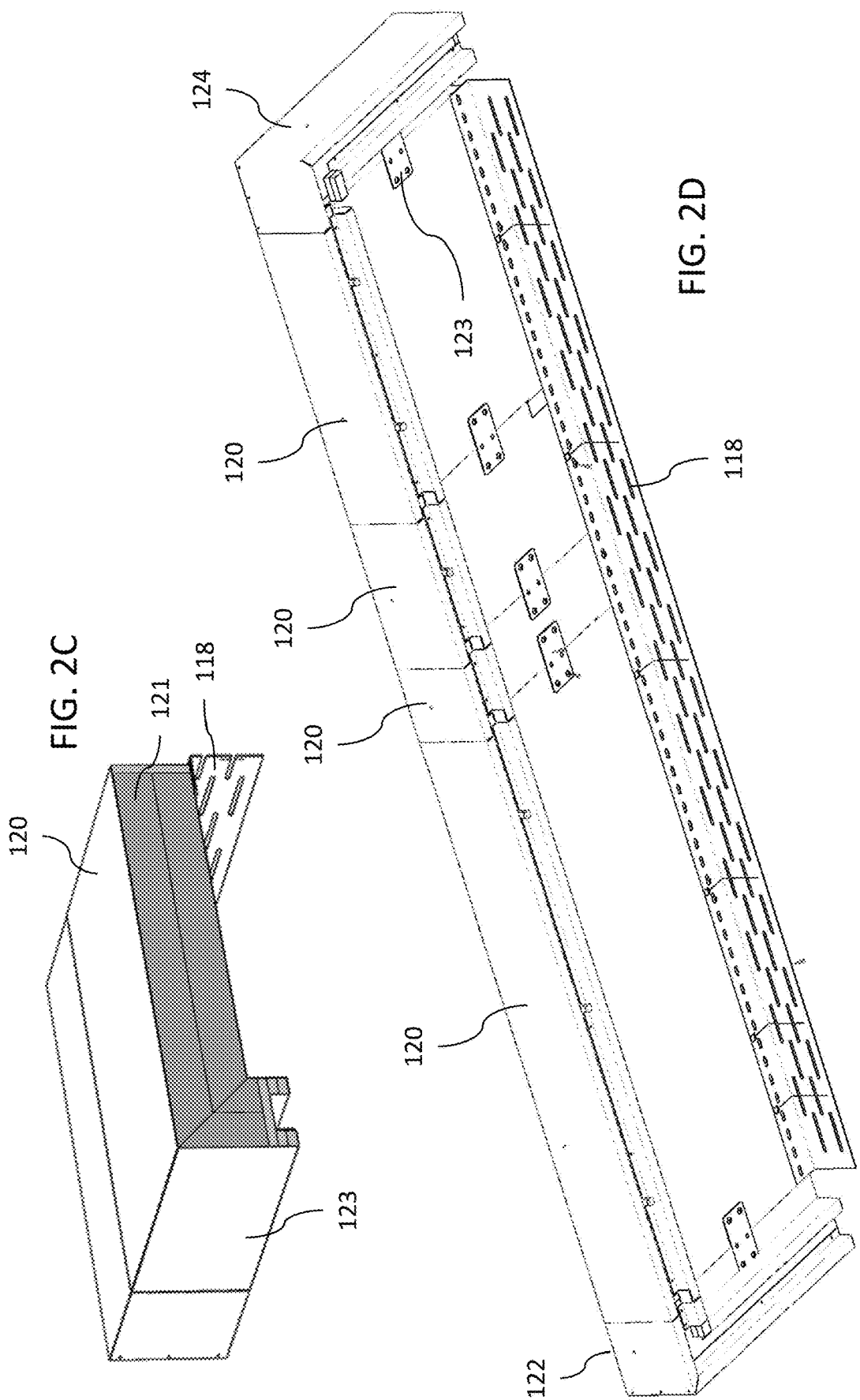

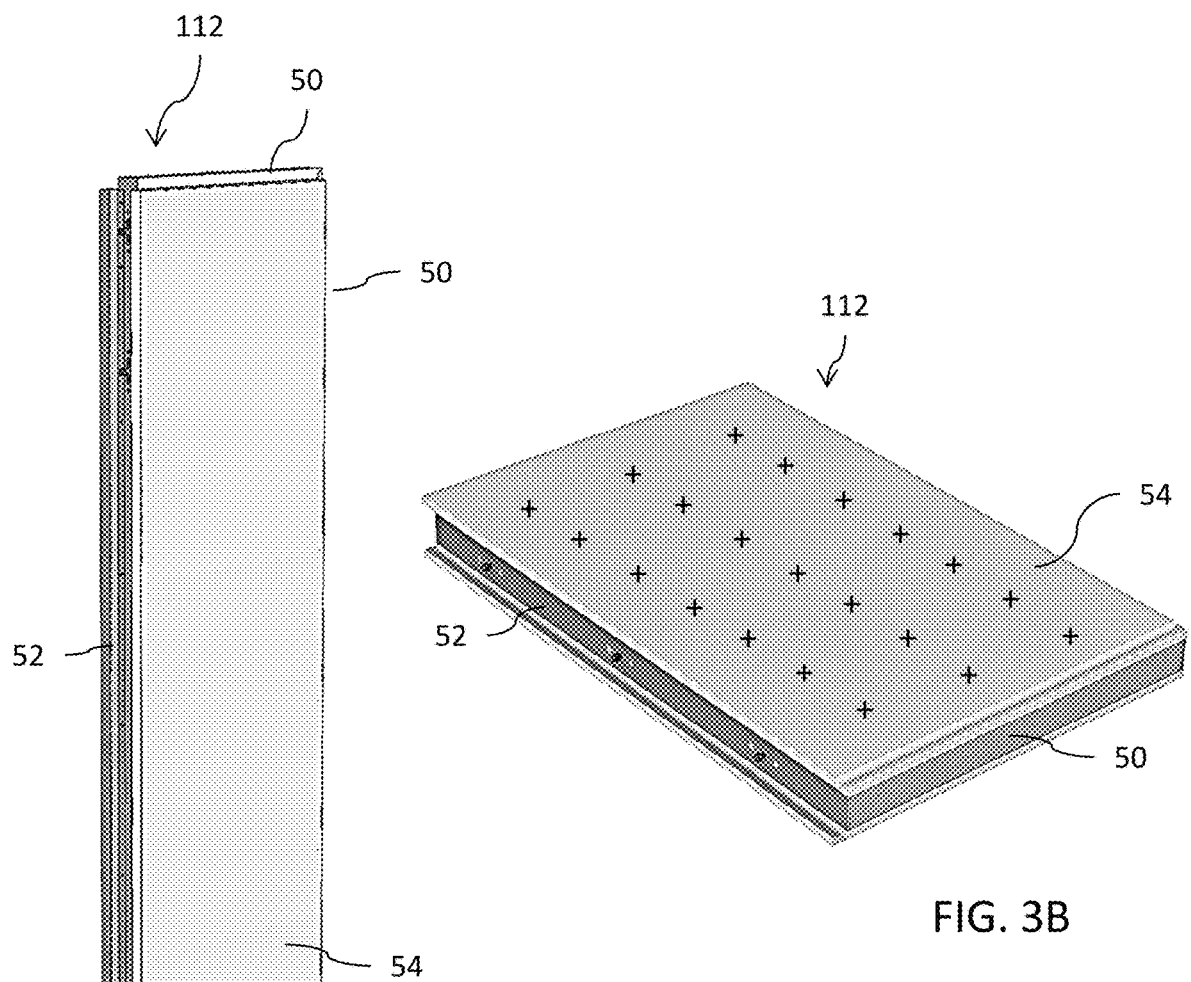
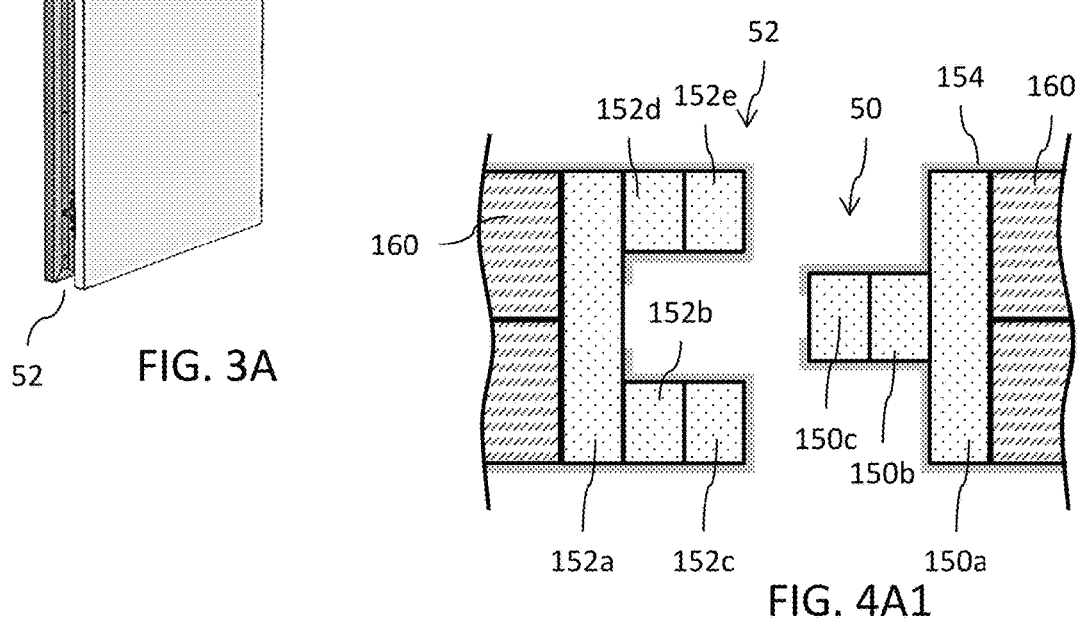

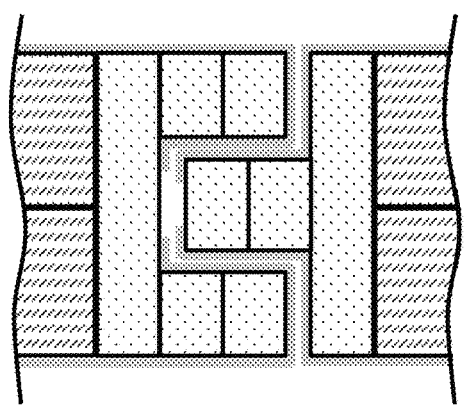
FIG. 4A2
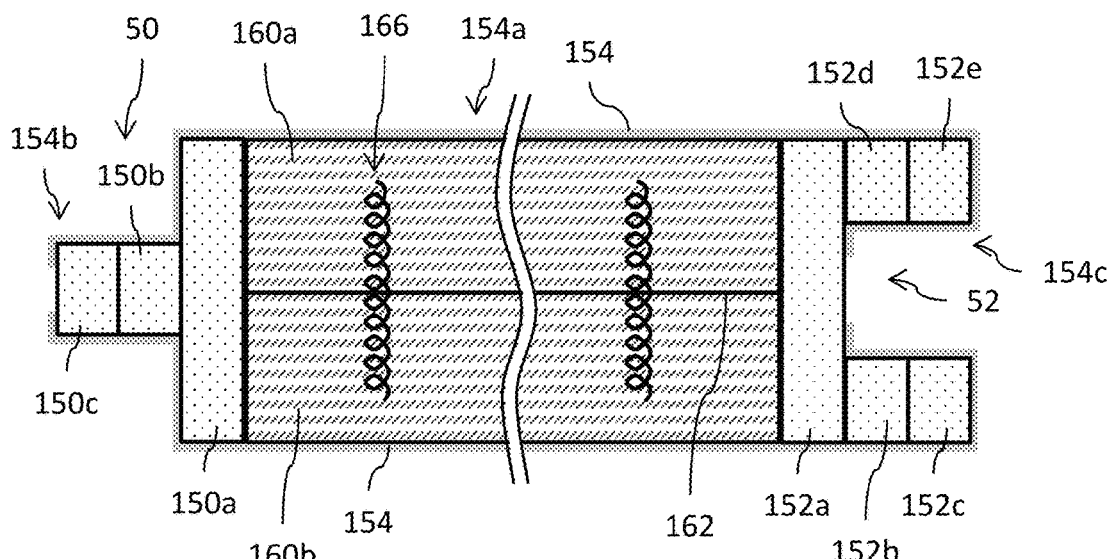
FIG. 4B
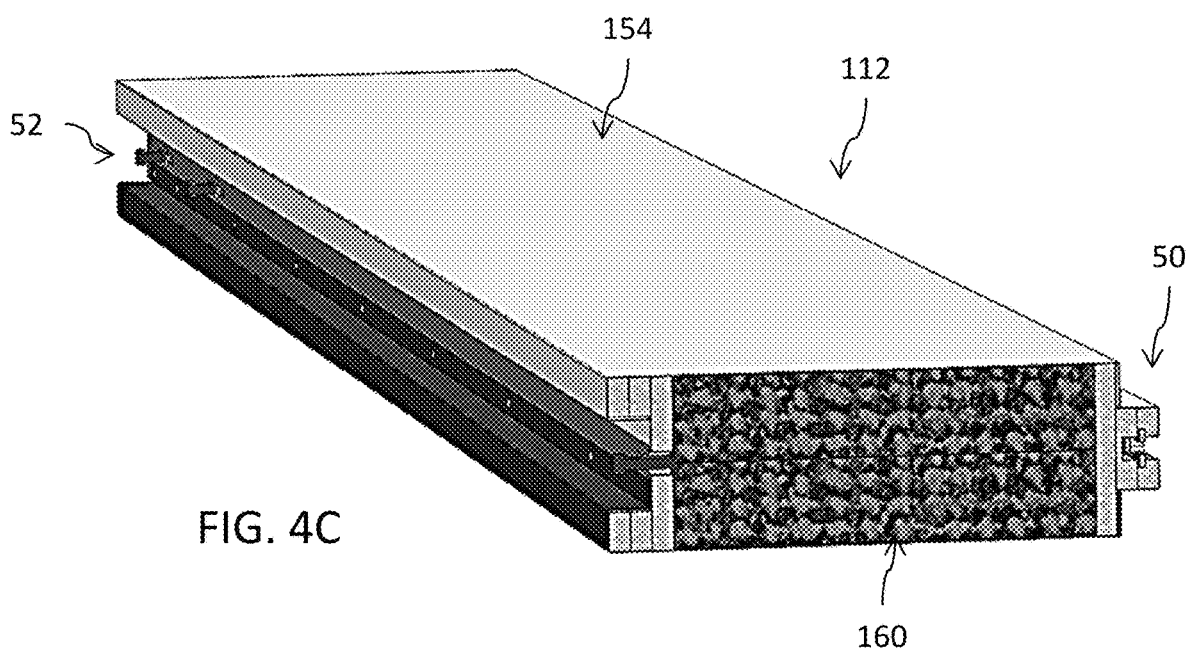
FIG. 4C

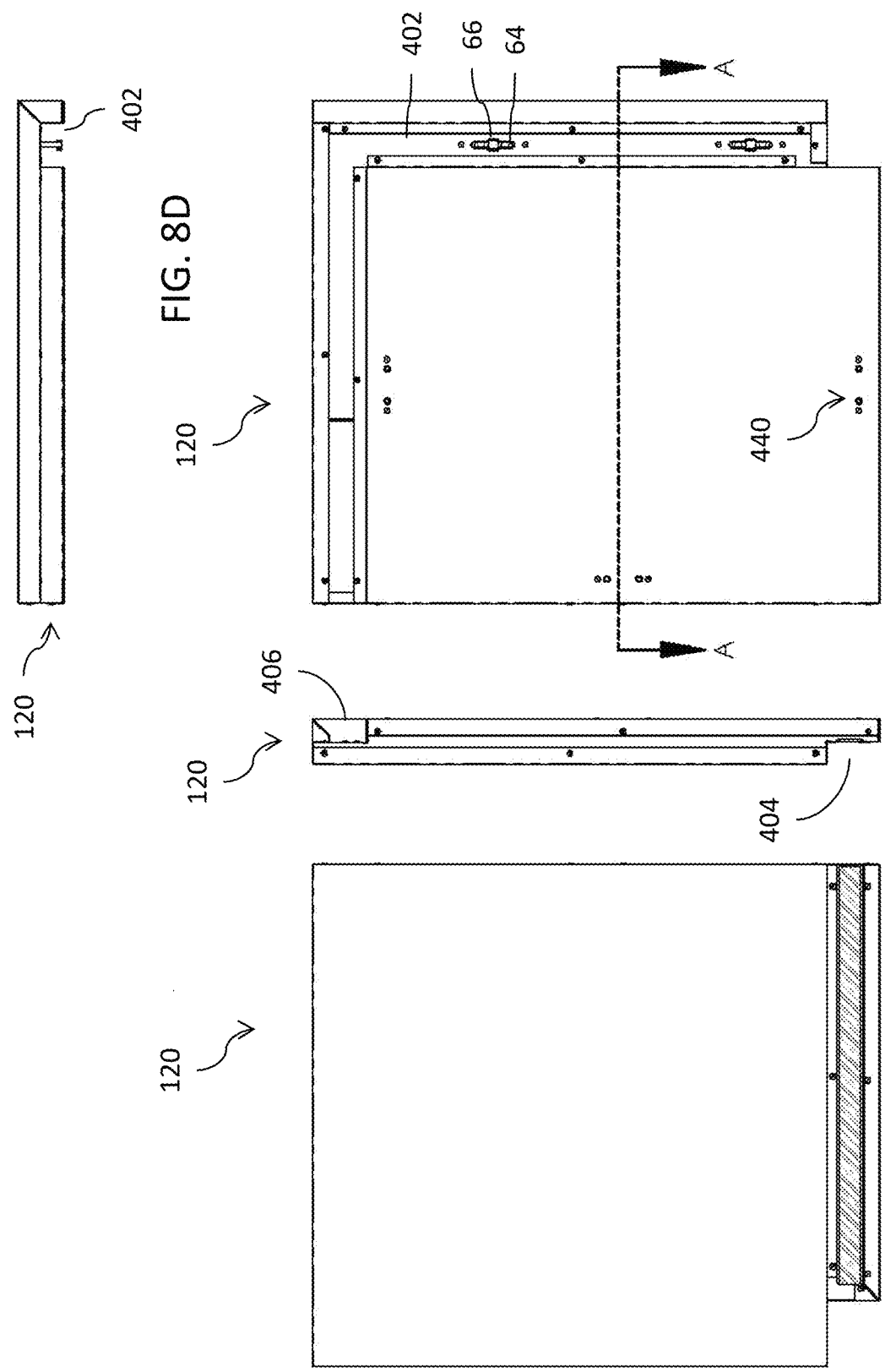

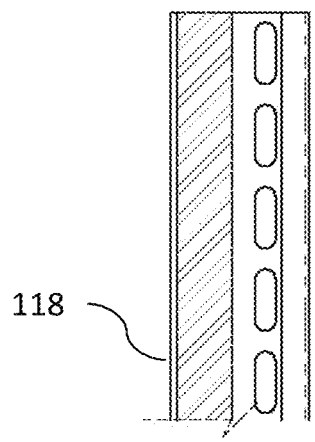
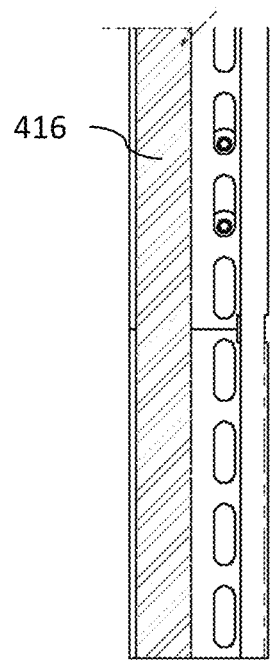
FIG. 10A
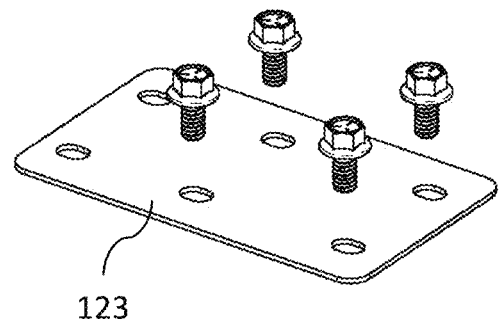
FIG. 11
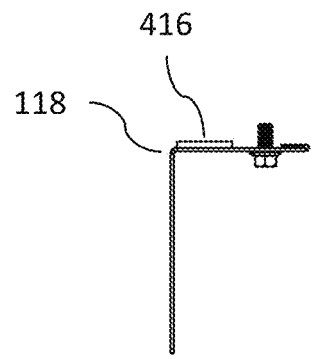
FIG. 10B

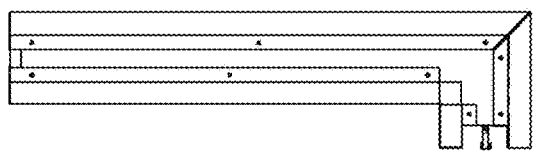
FIG. 12E
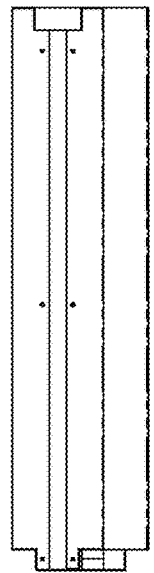
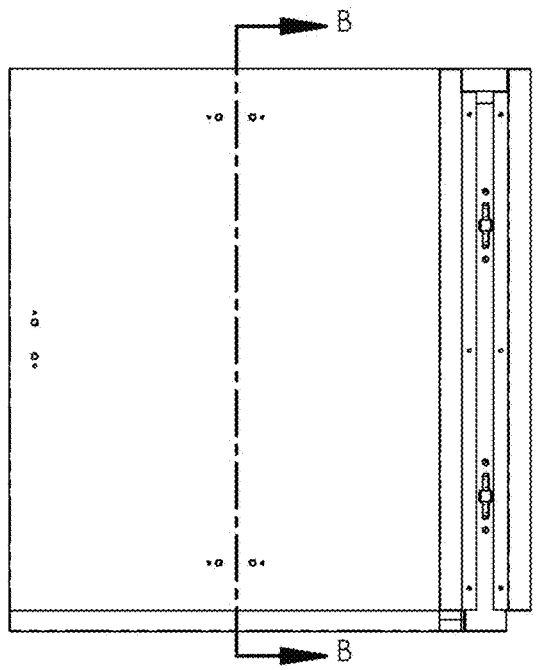
FIG. 12D  FIG. 12B  FIG. 12C
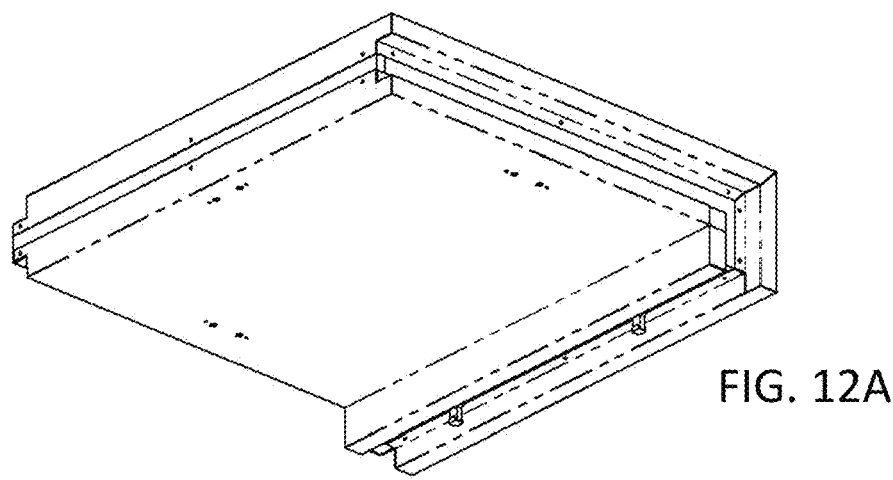
FIG. 12A
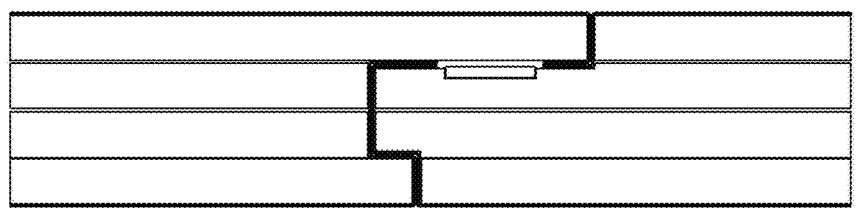
FIG. 13

CAP FOR A TEMPORARY WALL SYSTEM PROVIDING FIRE BARRIER PROTECTION

CROSS REFERENCE TO RELATED APPLICATIONS

This application claims priority from United States Provisional Application for Patent No. 63/389,461, filed Jul. 15, 2022, the disclosure of which is incorporated herein by reference.

TECHNICAL FIELD

The present invention generally relates to temporarily installed barriers for use in partitioning a space in construction and remodeling projects and, more particularly, to a system for temporary containment that provides a fire and sound barrier.

BACKGROUND

During the construction or remodeling of a building interior it is often desirable to temporarily partition the space. In one conventional solution, a temporary barrier is constructed. The temporary barrier may be a soft barrier (such as a plastic sheet) or hard barrier (comprising a light duty wall constructed on site from wood or gypsum panels mounted to a frame which is attached to the walls, ceiling and floor). A further advancement in the art provides for the installation of a prefabricated barrier that is reusable following completion of the project. Examples of this are described in U.S. Pat. No. 10,041,249, and United States Patent Application Publication Nos. 2021/0238845, and 2022/0178138 (all of which are incorporated herein by reference).

When a building is occupied and a remodel is being performed, it is conventional for building and fire code regulations to require the presence of a barrier between the occupied space and remodel space that will provide for a level of fire and smoke protection (see, for example, ASTM E-84 and E-119 performance requirements). Providing this level of protection can be a challenge.

Construction or renovation of occupied spaces as covered under building and life safety codes (IBC, NFPA 101) dictates that any reduction in protection such as the demolition or penetration of a rated wall assembly, must be replaced by a temporary structure of equal or greater rating. A fundamental condition associated with this requirement is that when the rated wall assembly serves as a "Fire Barrier," the construction must be a continuous surface from the floor to the building deck above. An example of a temporary fire barrier structure with floor-to-deck coverage is shown in FIG. 1 which illustrates a section of a temporary barrier 10. The barrier 10 is formed by a plurality of panels 12 that are mounted to the floor 14 and side walls 16 of the space. It will be noted that the height of the panels 12 does not reach the underside of the deck 18 of the overlaying floor. A constructed soffet 18 is used to fill the space between the top edge of the panels 12 and the underside of the deck 18.

In many building settings, for example with commercial and healthcare spaces, the provision of a barrier 10 like that shown in FIG. 1 is complicated by the complexity and density of building utilities above a corridor or room ceiling. For example, FIG. 1 shows the presence of structural members (such as truss assemblies) as well as plumbing, electrical and HVAC in an area between the top edge of the panels 12 and the underside of the deck 18. These structures complicate the construction of the soffet 18 and in some case may prevent construction of an efficient or effective wall assembly.

There is a need in the art for a temporary rated protection barrier which is prefabricated and reusable, which provides a level of fire block protection, and does not require the construction of a soffet.

SUMMARY

In an embodiment, a continuous temporary fire barrier for use around a construction area is provided, without the need to go to or above an existing ceiling in the space, thus avoiding the complexity and cost of going to the deck and facilitating code compliance and faster construction phasing. A modular wall assembly is used to partition a space. The modular wall assembly is mounted to the floor and side walls of the space (but does not reach in height to ceiling or the overlying deck). The partitioned space is enclosed at the top of the modular wall assembly by a modular cap assembly. The modular cap assembly is formed by a modular reusable panel system specifically engineered to meet fire barrier performance requirements when assembled onto the top of the modular wall system.

BRIEF DESCRIPTION OF THE DRAWINGS

For a better understanding of the embodiments, reference will now be made by way of example only to the accompanying figures in which:

FIGS. 2C and 2D illustrate perspective views of an alternative embodiment for the modular ceiling system of the temporary barrier;

FIGS. 3A and 3B show perspective views of an individual flat panel for use in the temporary barrier;

FIGS. 4A1 and 4A2 are cross sectional views showing the tongue and groove configuration of the flat panels in a disconnected and connected relationship, respectively;

FIGS. 4B and 4C are cross sectional views of the flat panel;

FIGS. 7CR and 7DR are top and bottom, respectively, perspective views of a right end cap for the temporary barrier;

FIGS. 8A and 8B are top and bottom, respectively, views of the flat cap for the temporary barrier;

FIGS. 8C and 8D are side views of the flat cap for the temporary barrier;

FIGS. 9AR-9ER show views, corresponding to those of FIGS. 8A-8E, for the right end cap of the temporary barrier;

FIG. 9FR is an exploded perspective view of the right end cap for the temporary barrier;

FIGS. 10A and 10B show top and cross-sectional views, respectively, of a wall support track for the temporary barrier;

FIG. 11 is a perspective view of a joiner plate for the temporary barrier;

FIGS. 12A-12E show views of an alternative embodiment for the cap of the temporary barrier; and FIG. 13 shows an alternative cap-to-cap joint arrangement that uses both a tongue and groove joint and a shiplap joint.

DETAILED DESCRIPTION

Figure 2A:
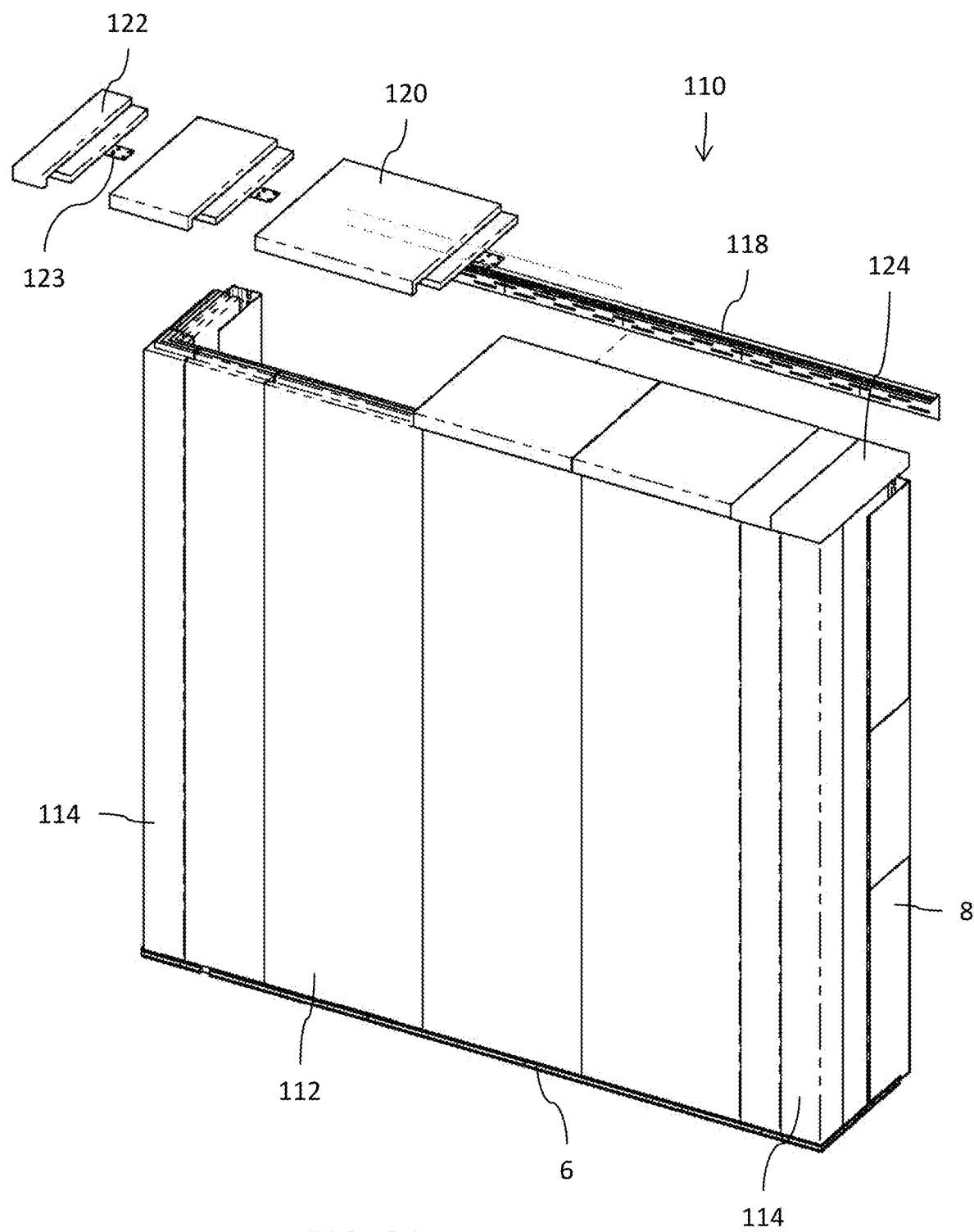
FIGS. 2A and 2B illustrate perspective views a section of a temporary barrier installed to partition a space.
Figure 2B:
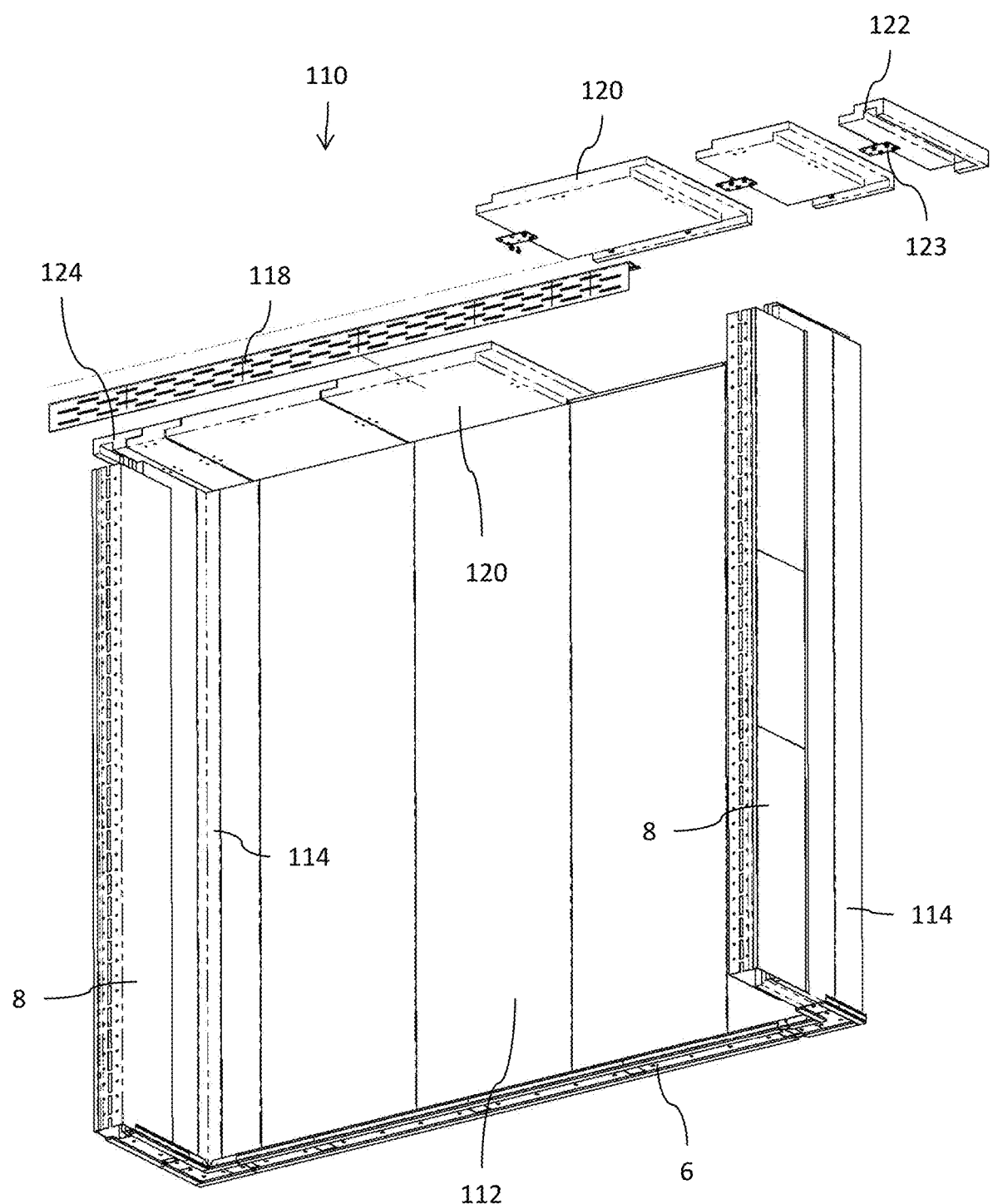

Reference is now made to FIGS. 2A and 2B which illustrate perspective views of a section of a temporary barrier 110 to partition a space. The illustration of FIG. 2A is of one side (for example, outside) of the barrier generally looking down and the illustration of FIG. 2B is of the other, opposite, side (for example, inside) of the barrier generally looking up. The barrier 110 is formed by a modular wall system comprising a plurality of flat panels 112. Each flat panel 112 has a same thickness. The flat panels 112 can be provided in a number of different width dimensions as well as in a number of different height dimensions. The modular wall system of the barrier 110 is further formed by a plurality of corner panels 114. These corner panels can be provided in a number of different height dimensions and with a number of different bend angles (90° and 45°, for example). The barrier 110 is further formed by a modular ceiling system that mounts to the top edge of the panels 112 and 114 and is further supported at the wall by a support track 118. The modular ceiling system comprises a plurality of flat caps 120. Each flat cap 120 has a same thickness. The flat caps 120 can be provided in a number of different width dimensions as well as in a number of different length dimensions. The modular ceiling system further comprises a left end cap 122 and a right end cap 124. Although end caps 122, 124 conforming to a 90° angle of the corner panels 114 are illustrated, this is by example only and the end caps 122, 124 could instead be designed to match other angles at the corners. The caps 120, 122, 124 are configured to partially overlap each other at a shiplap joint and can be secured to each other across that shiplap joint using a joiner plate 123 (see, FIG. 11) which is in one embodiment is screwed to the bottoms of the caps 120, 122, 124 to bridge across the seam of the shiplap joint.

FIGS. 2C and 2D show perspective views of an alternative embodiment for the modular ceiling system. FIG. 2C shows an individual cap 120 and FIG. 2D shows an assembly of caps forming the modular ceiling system. As will be discuss in more detail here, it will be noted that the embodiment shown in FIGS. 2C, 2D differs from the embodiment shown in FIGS. 2A, 2B in one way in that the joint between adjacent caps 120, 122, 124 is different. Specifically, for example, as show in in FIGS. 12A-12E, the joint between adjacent caps 120, 122, 124 is formed instead by a tongue and groove. Each of the embodiments for caps 120, 122, 124 shares in common a configuration where a bottom edge of each cap includes a channel configured to receive and engage with a tongue at a top edge of the panels 112, 114 forming an interlocking mechanism.

The barrier 110 further includes a floor track 6 which can be secured to the floor and is configured to receive the bottom edge of the panels 112 and 114, as well as a wall track 8 which can be secured to the wall and is configured to receive the side edge of the panels 112.

The panels 112 are interlocked with each other using an interlocking mechanism. In an embodiment, the interlocking mechanism comprises a tongue and groove assembly (not shown in FIGS. 2A and 2B, see FIGS. 4A1 and 4A2 for example) and a panel lock mechanism (not shown in FIGS. 2A and 2B, see FIGS. 5A-5C). This is just one example, and other interlocking mechanisms could instead be utilized.

The use of an interlocking panel-based assembly for the modular wall system of the barrier 110 provides for maximum flexibility and adaptability to handle a wide range of installation conditions or situations as typically arise in order to meet the needs for containment of an interior space during renovation. This is accomplished through the provision of interlocking panels with varying dimensional sizes that can be specifically selected to meet the length and height requirements of the barrier for partitioning off the space.

The barrier 110 formed by the modular wall system and the modular ceiling system is designed to provide basic but complete functionality for a fire barrier system that meets, at the very least, ASTM E-84 and E-119 performance requirements. Additionally, the barrier 110 is designed to provide an Infection Control Risk Assessment (ICRA) negative pressure performance functionality.

The barrier 110 system is generally comprised of modular cap panels, each of a width to match the modular wall panel it rests on, and includes left and right 'corner' cap panels to meet the perpendicular end walls and engage with corner wall panels. Each of the cap panels incorporates a tongue and groove connection to the mating wall panel below, and (for the embodiment of FIGS. 2A, 2B) a shiplap connection left and right to adjoining cap panels. A wall track angle 118 is provided for support on the rated building wall for the free side of the cap panels. Each cap panel is secured to this wall track angle with threaded screws. Individual cap panels are further joined together with steel joiner plates 123, secured with threaded screws, on the underside of each inter-cap (for example, shiplap) joint, to restrict movement in the assembly and during seismic or fire events.

Cap panels are provided in 6"×24", 12"×24", 24"×24" and 48"×24" sizes to correspond to the sizes of the mating wall panels. The system may be adapted to larger sizes in both depth and width as needed.

The cap panels are constructed of light gage steel skins (pans) and layers of MgO board stock, using blind rivets for the assembly. The inner and outer skins are arranged so as to not permit thermal conductivity between them during thermal distortion caused by heating. A strip of intumescent material is bonded to at least one half lap of the shiplap joint to prevent hot gasses from passing through the joint between panels. This construction meets the thermal performance requirements of the one hour fire test.

The modularity of the cap panels with their shiplap joint details provides an operational advantage in terms of providing a reusable, adaptable and fire rated ceiling assembly for containment purposes. The system is further able to provide negative pressure spaces inside the volume, protecting the occupants from dust, mold and bio hazards exposed during demolition activities.

Figure 1:
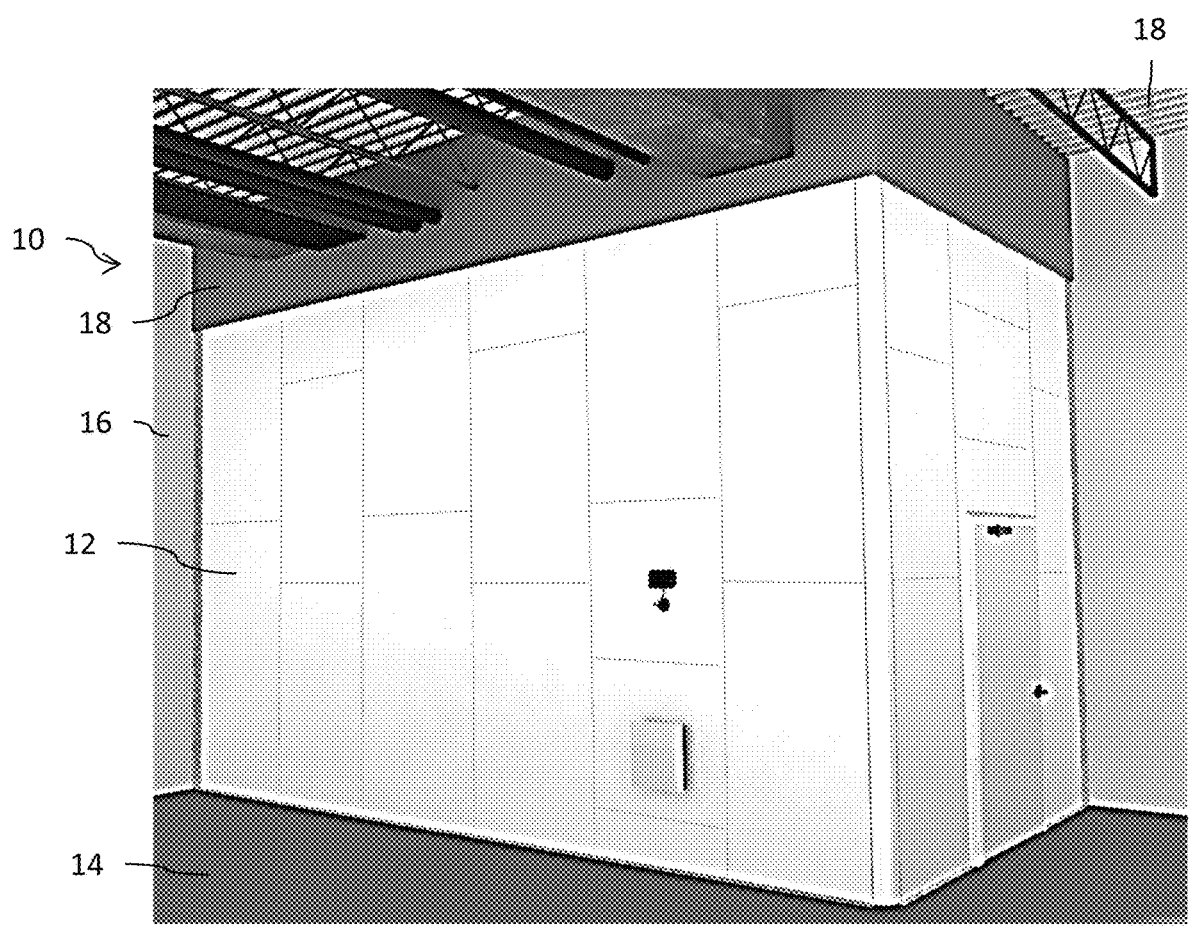
FIG. 1 illustrates a section of a temporary barrier installed to partition a space.

Reference is now made to FIGS. 3A and 3B which show perspective views of an individual wall panel 112. The peripheral edge (top, bottom, left, right) of each panel is provided with a tongue and groove assembly, and left and right edges of each panel also support a panel lock mechanism (to be described, see FIGS. 5A-5C) for interlocking laterally adjacent panels to each other at a vertical joint to provide a greater width for the barrier, and wherein the tongue and groove assembly at the top/bottom edges supports vertically interconnecting panels at a horizontal joint to provide a taller height for the barrier. The tongue at the top edge of the panel 112 is further configured to support the panel lock mechanism in connection with securing the caps 120, 122 for the modular ceiling to the top edge of the modular wall. As an example, two adjacent side edges (top and right edges of a pair of adjacent edges in the illustration of FIG. 3A) are provided with tongues 50 and the opposite two adjacent side edges (left and bottom edges of another, opposed, pair of adjacent edges in the illustration of FIG. 3A) are provided with grooves 52. The tongue and groove assembly of the panels supports the provision of airtight joints as well as minimizes the seam between adjacent panels (see FIG. 4A1 showing the tongue and groove assembly with the panels disconnected, and FIG. 4A2 showing the tongue and groove assembly with the panels connected in the interlocked configuration). The panels are symmetrical in design with the side faces 54 being the same, and are configured to be clean/cleanable. The panels 112 provide fire rated protection and further provide for sound attenuation.

With additional reference now to FIG. 4B which shows a cross sectional illustration of a panel 112, as well as FIG. 4C which shows a cross-sectional perspective view of a panel, it will be noted that a peripheral frame is provided for each panel along the peripheral panel edge and that the peripheral frame defines the tongue 50 and groove 52. The peripheral frame is formed by a stack of strips made of magnesium oxide (MgO) that are assembled together. Each tongue 50 portion of the peripheral frame is made of a stack of three strips 150a, 150b and 150c, with strips 150b and 150c stacked and aligned with each other and then stacked on strip 150a in alignment with a longitudinal center of strip 150a. The strips 150 have a same thickness, with strip 150a having a width that is slightly less than a thickness of the panel and the strips 150b and 150c having widths selected in accordance with a size of the groove 52. In an embodiment, glue layers (not shown) may be used to attach the strips 150 to each other. This assembly of strips 150a, 150b and 150c, in cross section, forms a T-shape for each tongue 50 portion of the peripheral frame (where the top portion of the T-shape provides a support member and the lower portion of the T-shape provides the tongue member extending from the support member). Each groove 52 portion of the peripheral frame is made of a stack of five strips 152a, 152b, 152c, 152d and 152e, with strips 152b and 152c stacked and aligned with each other and then stacked with strip 152a in a position such that edges thereof are flush with one outer edge of strip 152a and with strips 152d and 152e stacked, aligned and glued to each other and then stacked and glued to strip 152a in a position such that edges thereof are flush with an opposite outer edge of strip 152a. The strips 152 have a same thickness, with strip 152a having a width that is slightly less than a thickness of the panel and the strips 152b, 152c, 152d and 152e having widths selected in accordance with a size of the tongue 50. In an embodiment, glue layers (not shown) may be used to attach the strips 152 to each other. This assembly of strips 152a, 152b, 152c, 152d and 152e, in cross section, forms a U-shape (where the lower portion of the U-shape provides a support member and the upper portions of the U-shape provide the groove side wall members extending from the support member).

Figure 4D:
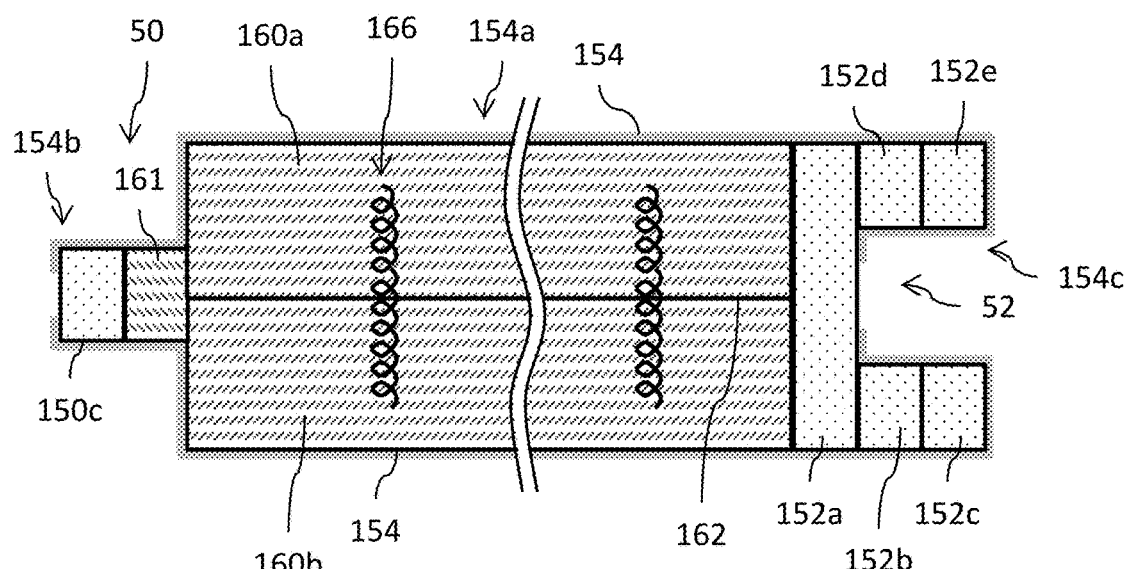
FIG. 4D shows an alternative embodiment.

The reference above to a particular number of strips of MgO being used in assembling the frame is by example only, it being understood that the frame can be made of any suitable number of strips (more or less that that described above). Indeed, it is possible in some embodiments to eliminate a strip within the frame (see, strips 150a and 150b, for example, which can be omitted in an embodiment as shown in FIG. 4D) in order to save weight and/or cost. In an embodiment, the eliminated strip(s) may be replaced by portions of the layers 160 and/or by an additional insulating layer strip 161.

In connection with an alternative implementation, the tongue portions 50 and groove portions 52 of the peripheral frame of the panel 112 may instead each be made of a single piece of MgO material that is dimensioned and milled to form the T-shape and U-shape cross sectional profiles, respectively, that are needed for the tongue and groove assembly.

It will also be noted that the use of a plurality of MgO sheets for the core may alternatively be implemented as a single sheet having a greater thickness or by a mineral wool filling. Such a configuration is shown in FIG. 2C where the cap 120 is formed using a mineral wool core 121.

The use of Magnesium Oxide for the material of the peripheral frame is preferred as the MgO material releases water molecules when heated, with the water being converted to steam in a fire event. This serves to regulate heat flow (thermal transfer) through the panel.

The opposed side faces 54 of each panel 112 are formed by a metal layer 154 (for example, made of steel sheet material also referred to as a pan) that is secured (for example, using mounting screws and/or adhesive) to the dimensional strips 150, 152 forming the peripheral frame. The metal layer 154 on one side of the panel 112 is not directly connected to the metal layer 154 on the opposite side of the panel 112 in order to ensure there is no direct thermal channel between the opposed faces 54 of the panel. Each metal layer 154 may be formed of multiple pieces or portions including a face portion 154a, a tongue portion 154b and a groove portion 154c. The face portion 154a covers the side face 54 as well as the end surface of strip 150a at the tongue 50 and the end surface of strip 152c (152e) at the groove 52. The tongue portion 154b covers at least a portion of the end of the strip 150c and the sides of the strips 152b, 152c at the tongue 50. The groove portion 154c covers at least a portion of the strip 152a and inner sides of the strips 152b, 152c (inner sides of the strips 152d, 152e) at the groove 52. The portions 154a, 154b, 154c may be provided as separate pieces that are assembled together to form the metal layer 154 for each of the opposed side faces 54.

The interior space of the panel 12 delimited by the peripheral frame and the opposed face portions 154a is filled with a thermal insulator which includes, for example, a stack of two mineral wool layers 160a, 160b. A layer 162 of aluminum foil may be positioned between the two mineral wool layers 160a, 160b to form a radiant thermal barrier layer for the thermal insulator. Coil anchors 166 made of a coil wound metal wire material may be used to join the two mineral wool layers 160a, 160b to each other, with each coil anchor extending through the aluminum foil layer 162 (if present) and engaging the material of layers 160a and 160b. A plurality of these coil anchors 166 are provided for each panel 12, and the plurality of coil anchors 166 are positioned in an array (or matrix) format (for example, at the locations identified by "+" indicators in FIG. 6B). In an embodiment, an adhesive layer may be used to attach the mineral wool layers 160a, 160b to each other and further adhesive layers may be used to attach the mineral wool layers 160a, 160b to their adjacent face portions 154a.

Figure 5A:
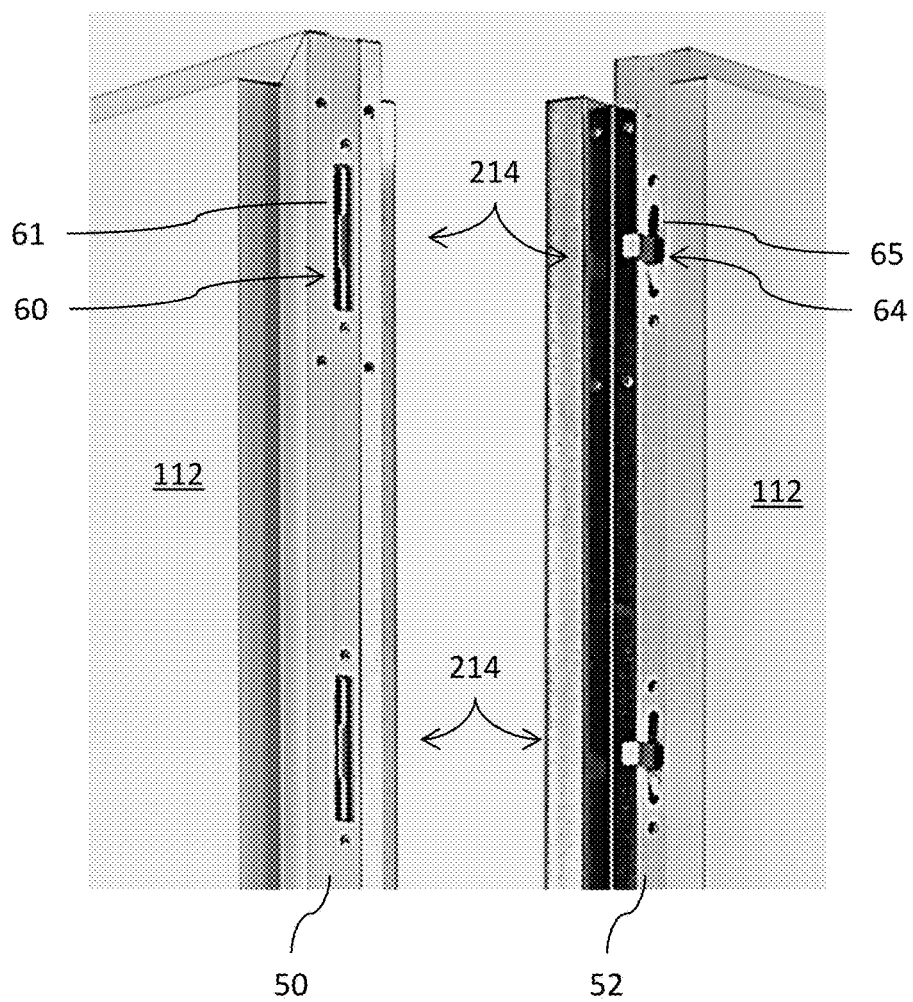
FIGS. 5A, 5B and 5C illustrate views of a panel lock mechanism for joining adjacent flat panels in the temporary barrier.
Figure 5B:
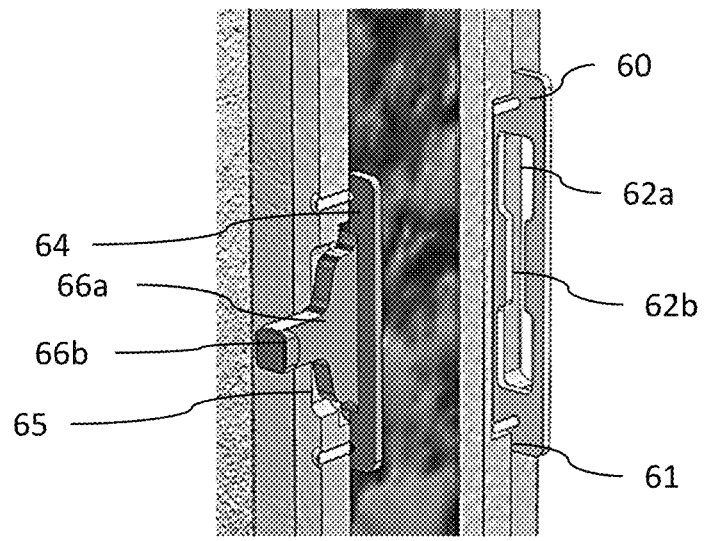
Figure 5C:
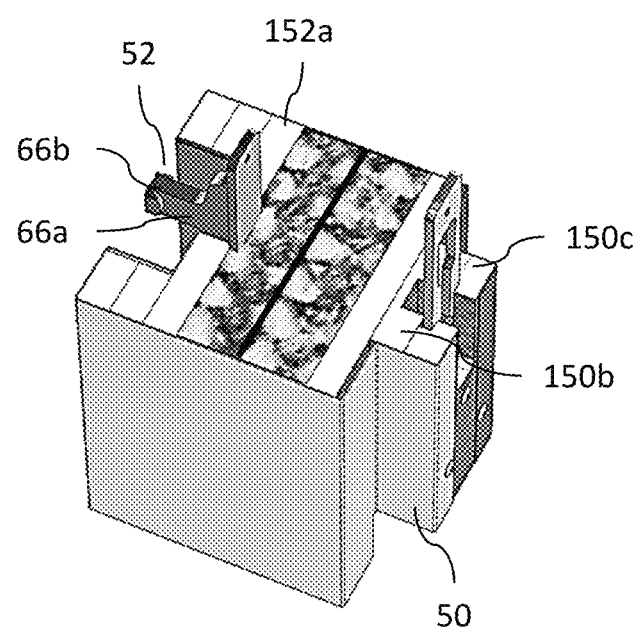

Adjacent panels 112 are locked to each other using a panel lock mechanism 214 provided in the form of mounted hardware as shown in FIGS. 5A-5C. The panel lock mechanism 214 includes a strike plate 60 mounted within an opening 61 in the tongue 50. The opening 61 may, for example, be formed in the strips 150b, 150c of the tongue portion. The strike plate 60 includes a slot opening 62. The slot opening 62 has, in plan view, a dog-bone type shape with larger holes 62a at opposite ends joined by a narrower channel 62b. The panel lock mechanism 214 further includes a latch plate 64 mounted within an opening 65 in the groove 52. The opening may, for example, by formed in the strip 152a of the groove portion. The latch plate 64 includes a latch knob 66 extending perpendicularly from the plate. The general shape of the latch knob 66 includes a shaft portion 66a mounted at a proximal end to the latch plate 64, and a head portion 66b mounted at a distal end of the shaft portion 66a. The diameter of the shaft portion 66a is smaller than the width of the channel 62b. The diameter of the head portion 66b is smaller than the hole 62a but larger than the width of the channel 62b.

To interlock one panel to another panel, a lift and drop construction is supported where the tongue 50 of one panel is inserted into the groove 52 of another panel with the head portion 66b aligned with and inserted into the hole 62a. The one panel is then dropped into place with the head portion 66b engaging the channel 62b to secure the two panels together. The tongue and groove engagement of the panels 112 along with the panel lock mechanism 214 produces a tight interlock between panels that supports ICRA Class IV performance of the barrier 110.

Figure 6A:
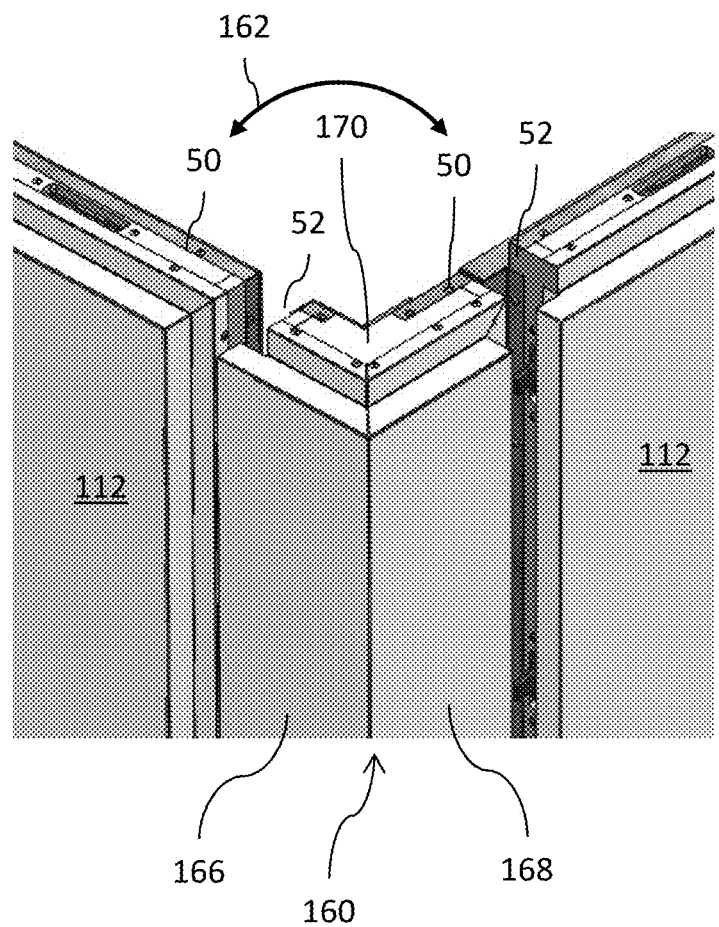
FIGS. 6A-6B are perspective views of a corner panel for the temporary barrier.
Figure 6B:
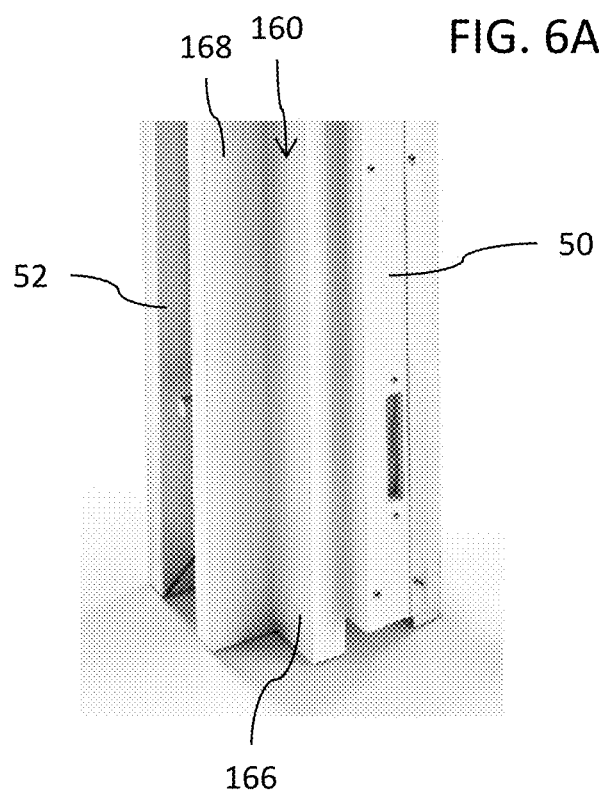

To accommodate change in direction of the barrier when partitioning a space, the modular wall system of the barrier 110 further includes a corner panel 114 as shown in FIGS. 6A-6B. The angle 162 defined by the corner panel 114 is shown in the illustration as 90°, but it will be understood that the corner panel 114 can be made with any fixed selected angle (for example, 45°). The corner panel 114 is formed by a first leg portion 166 and second leg portion 168 which are coupled to each other through an angle transition portion 170 whose configuration defines the angle 162. The corner panel 114 is constructed in a same way as the panels 112 and supports interconnection with the same tongue and groove configuration (see, FIGS. 4A1, 4A2, 4B and 4C) and same panel lock (see, FIGS. 5A, 5B and 5C). For example, the first leg portion 166 includes the groove 52 and the second leg portion 168 includes the tongue 50. The corner panel 114 will be made of varying heights conforming to the heights of the panels.

Figure 7A:
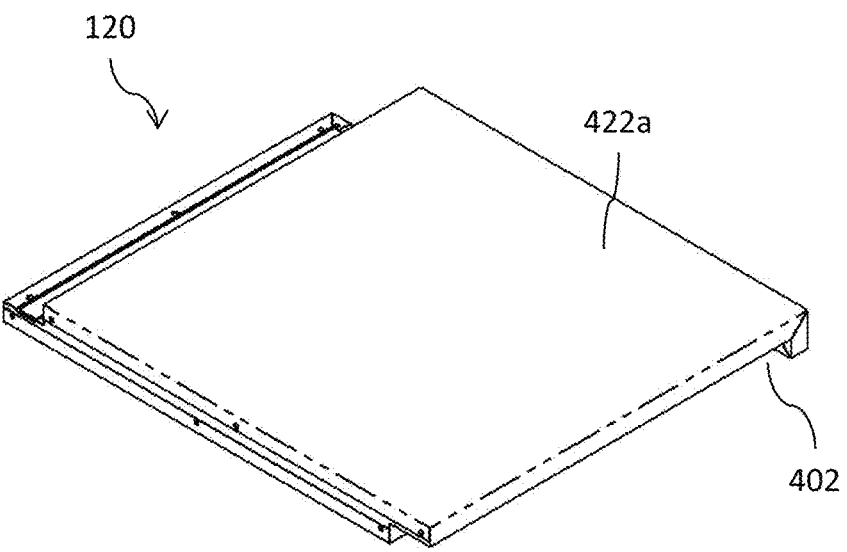
FIGS. 7A and 7B are top and bottom, respectively, perspective views of a flat cap for the temporary barrier.
Figure 7B:
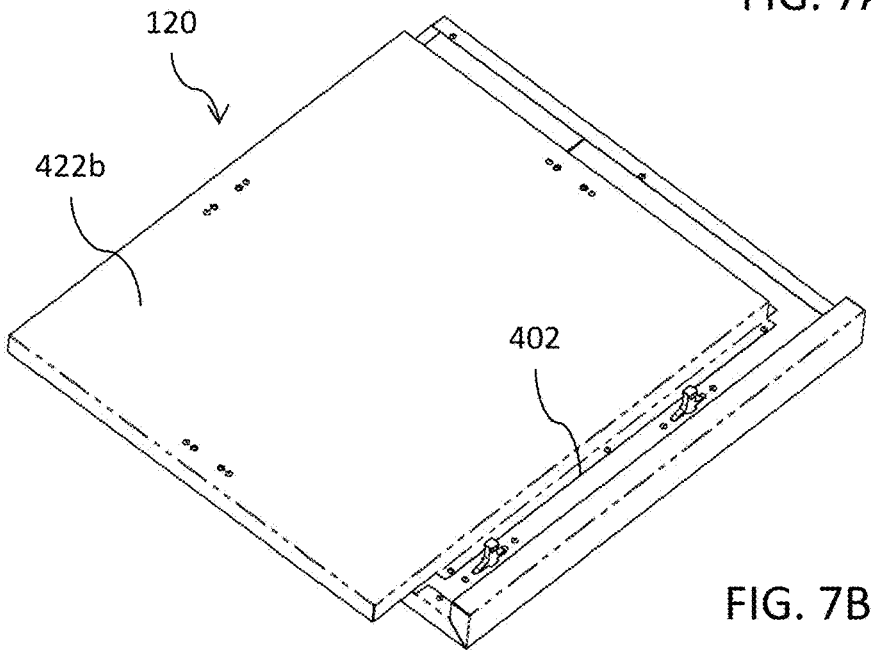

Reference is now made to FIGS. 7A and 7B which show top and bottom, respectively, perspective views of the flat cap 120 for the modular ceiling assembly. The bottom of each flat cap 120 is provided with a groove 402 for engaging with the tongue 50 on the top edge of the panels 112 and 114. This groove 402 further supports the panel lock mechanism (as previously described, see FIGS. 5A-5C) for interlocking each flat cap 120 to the panels 112 and 114 at a horizontal joint. The tongue and groove assembly of the cap 120 to the panels 112 and 114 supports the provision of airtight joints. The caps 120 provide fire rated protection and further provide for sound attenuation.

To interlock one flat cap 120 to a wall panel 112, a drop and slide construction is supported where the tongue 50 of at the top edge of the panel 112 is aligned with the groove 402 on the bottom of the flat cap 120 with the head portion 66b aligned with and inserted into the hole 62a. The flat cap 120 is then dropped into place over the wall panel 112 (supported at its free end by the support track 118) and the cap is laterally slid with the head portion 66b engaging the channel 62b to secure the cap 120 to the panel 112. The tongue and groove engagement of the cap to the panel along with the panel lock mechanism 214 produces a tight interlock between top edge of the panel and the cap that supports ICRA Class IV performance of the barrier 110.

As previously noted, FIGS. 2C and 2D show an alternative implementation for the cap. This construction is thicker than the cap shown in FIGS. 7A and 7B due to the use of the mineral wool core. Furthermore, the shape configuration for the FIG. 2C cap differs from the shape configuration of the FIGS. 7A and 7B cap. The cap shown in FIGS. 7A and 7B cap is a "flat" cap shape, while the FIG. 2C cap has as edge protrusion 123 where the channel is provided to engage with the top edge of the wall panel. Otherwise, the caps in FIGS. 2C, 7A, and 7B are similar in construction where the cores are framed by MgO strips and encased in sheet metal pans.

Figure 8E:
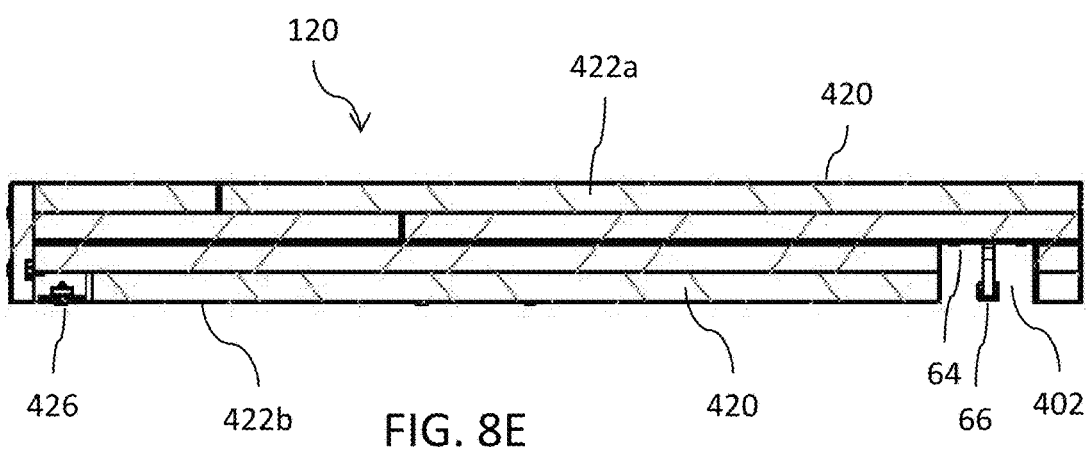
FIG. 8E is a cross-sectional view of the flat cap for the temporary barrier.
Figure 8F:
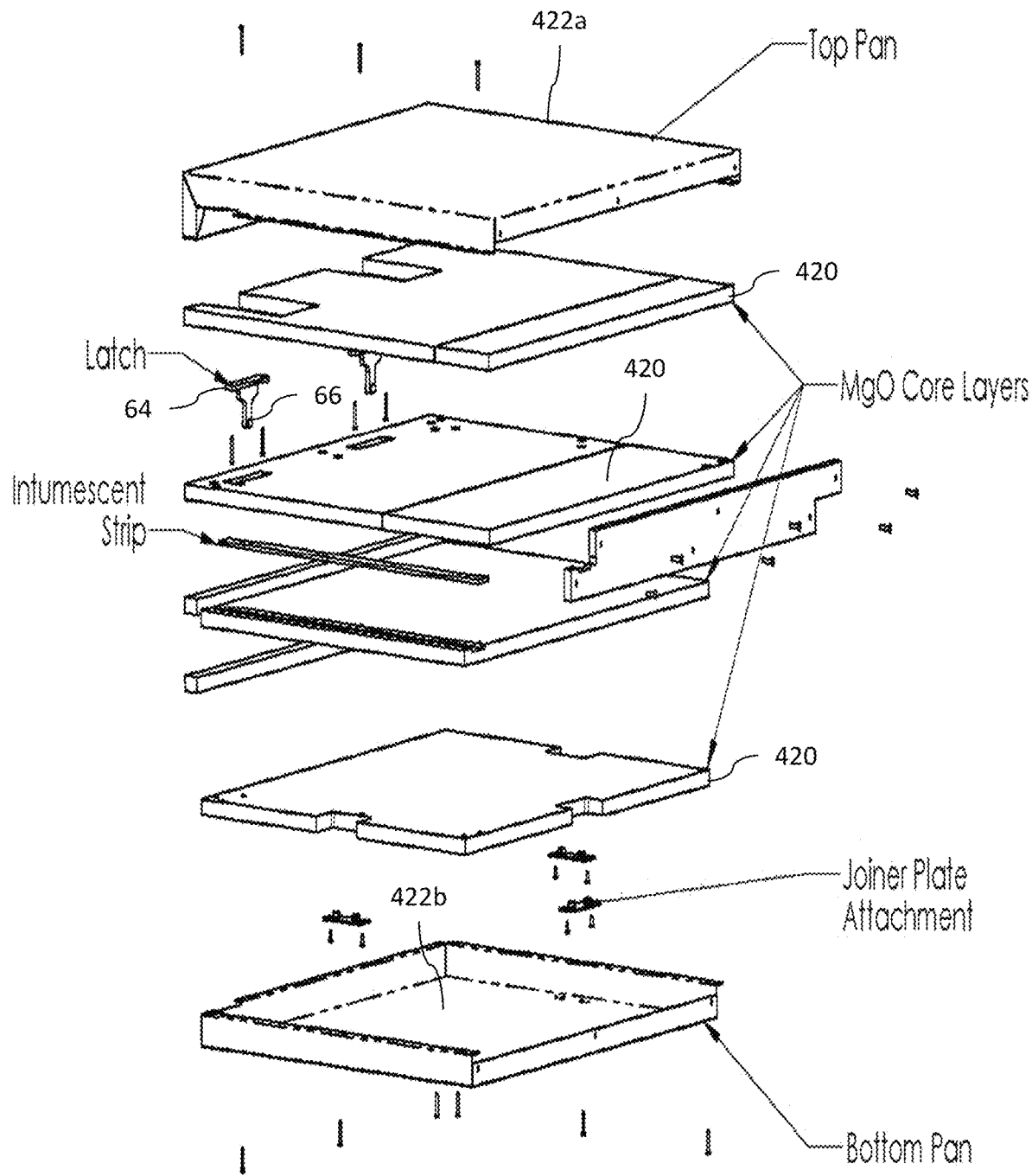
FIG. 8F is an exploded perspective view of the flat cap for the temporary barrier.

Additional reference is now made to FIGS. 8A and 8B which show top and bottom views, respectively, of the flat cap 120, along with FIGS. 8C and 8D which show side views and FIG. 8F which shows an exploded perspective view of the flat cap for the temporary barrier. The groove 402 extends along a first (front) edge of the flat cap 120. A second (rear) edge opposite the first edge is configured to be supported and secured to the support track 118. Opposed third and fourth (lateral) edges of the flat cap 120, which extend perpendicular to the opposed first and second edges, are shaped to support provision of an overlapping (shiplap type) joint between laterally adjacent flat caps 120. The third edge, for example, includes a side recess 404 on the lower surface of the flat cap 120 that provides the upper half lap of the shiplap joint. The fourth edge, for example, includes a side recess 406 on the upper surface of the flat cap 120 that provides the lower half lap of the shiplap joint. A slot in the bottom of the side recess 406 is filled with a strip of intumescent material.

Figure 9B:
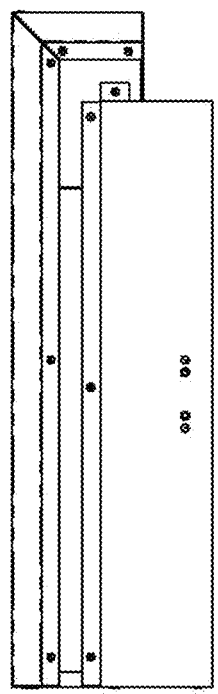
Figure 9D:
Figure 9C:
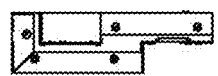

Reference is now made to FIG. 8E which shows a cross-sectional view of the flat cap 120 for the temporary barrier along with FIG. 8F showing the exploded perspective view. The flat cap 120 is formed by core comprising a plurality of layers 420 made of MgO sheet material and an end piece also formed of MgO. The core is encased between an upper pan 422a and a lower pan 422b made of sheet metal (for example, galvanized steel). It will be noted that the pans 422 are shaped to wrap around the sides of the cap 120. Rivets (shown in FIG. 8F) are used to secure the core between the pans 422a and 422b. A reinforced hardware plate (joiner plate attachment) 426 is provided in the construction to support mounting of the joiner plate 123 to secure adjacent caps 120 to each other. As shown in FIGS. 8B and 9B, openings 440 are provided in the pan 422b to access the plate 426. The screws extend through the openings 440 to engage a correspondingly threaded opening in the plate 426 for securing the joiner plate 123. The latch plate 64 with latch knob 66 is mounted within the groove 402.

Figure 7C:
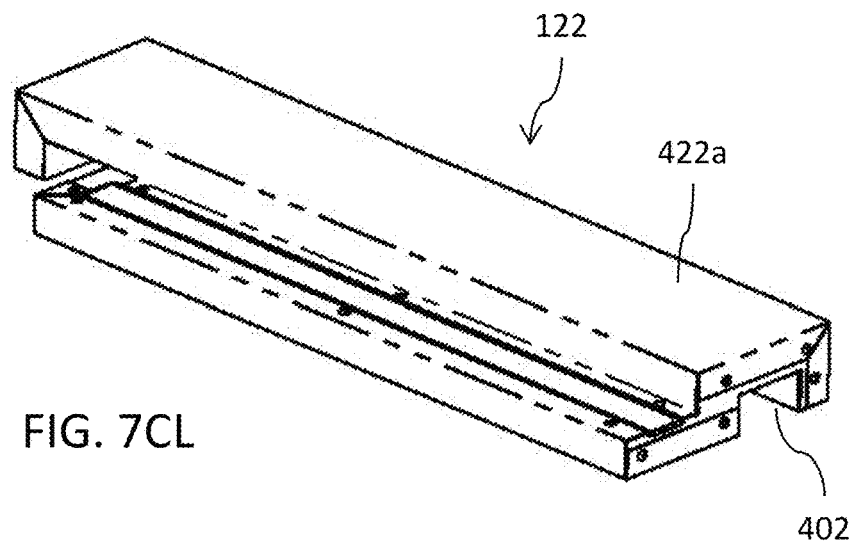
FIGS. 7CL and 7DL are top and bottom, respectively, perspective views of a left end cap for the temporary barrier.
Figure 7D:
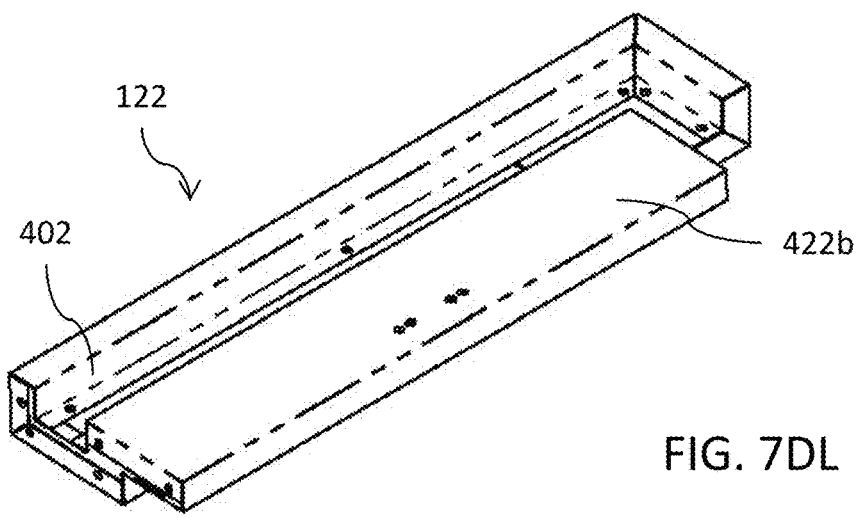
Figure 9E:
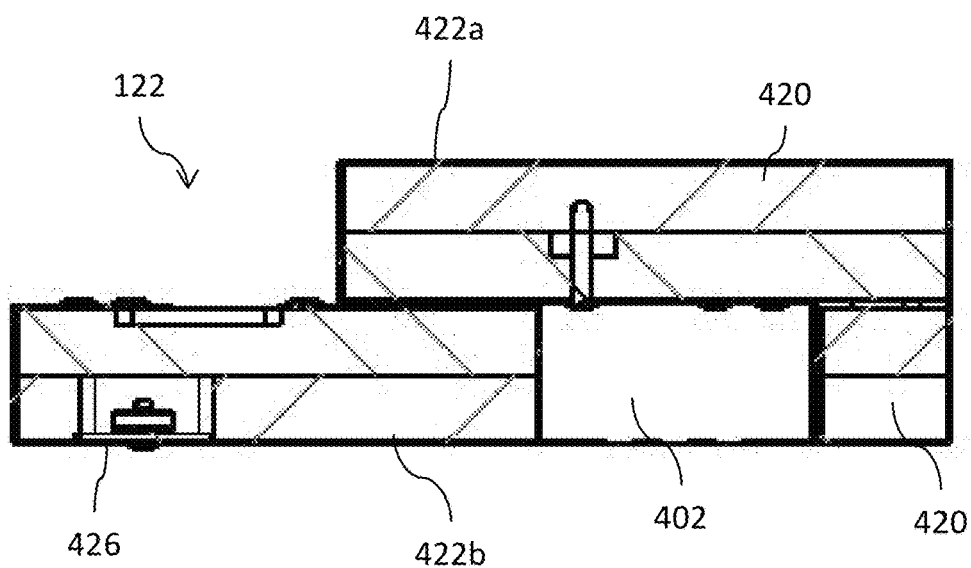
FIGS. 9AL-9EL show views, corresponding to those of FIGS. 8A-8E, for the left end cap of the temporary barrier.
FIG. 9FL is an exploded perspective view of the left end cap for the temporary barrier.
Figure 7C:
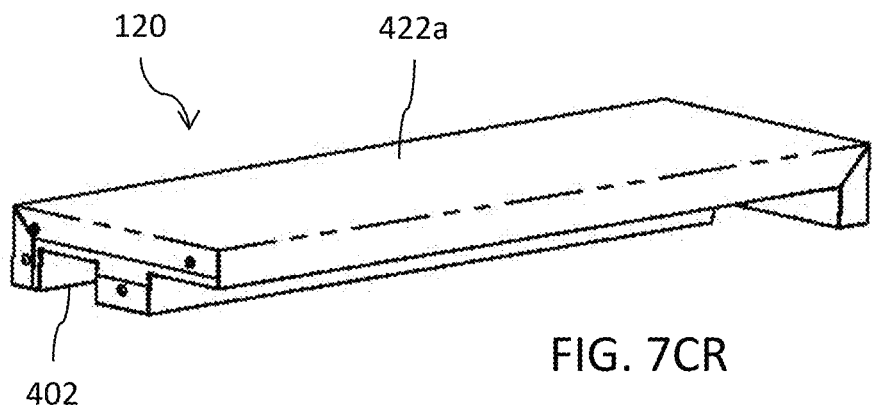
Figure 7D:
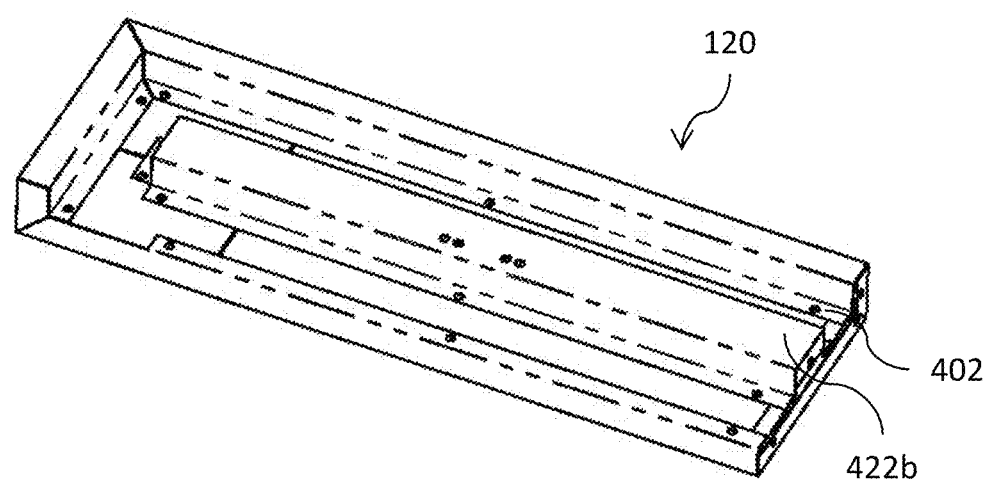
Figure 9E:
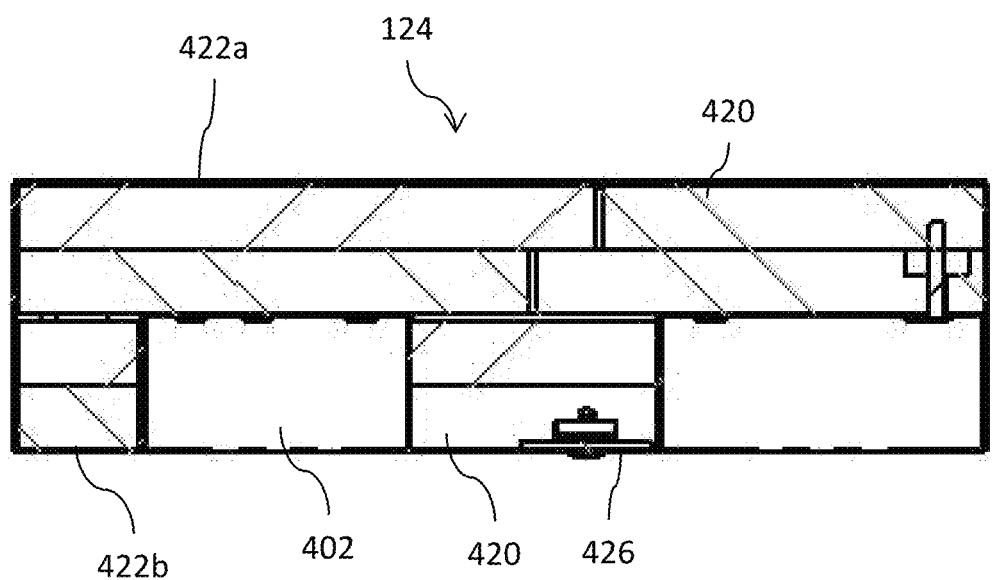

FIGS. 7CL and 7DL show top and bottom, respectively, perspective views of the left end cap 122 and FIGS. 7CR and 7DR show top and bottom, respectively, perspective views of the right end cap 124. The bottom of each end cap 122, 124 is provided with a groove 402 for engaging with the tongue on the top edge of the panels 112 and 114. This groove further supports the panel lock mechanism (as previously described, see FIGS. 5A-5C) for interlocking each end cap 122, 124 to the panels 112 and 114 at a horizontal joint. The tongue and groove assembly of the cap 122, 124 to the panels 112 and 114 supports the provision of airtight joints. The end caps 122, 124 provide fire rated protection and further provide for sound attenuation.

To interlock one end cap 122, 124 to a wall panel 112, a drop construction is supported where the tongue 50 of at the top edge of the panel 112 is aligned with the groove 402 on the bottom of the end cap 122, 124. The end cap 122, 124 is then dropped into place over the wall panel 112. The tongue and groove engagement of the cap to the panel along with the across the shiplap joint support produces a tight interlock between top edge of the panel and the end cap that supports ICRA Class IV performance of the barrier 110.

It will be noted that construction of the modular ceiling assembly begins with installation of the wall support track 118 on the rated building wall. The left end cap 122 is then dropped into place on the top edge of the panels 112, 114. This is followed sequentially by the installation of the caps 120 using the drop and slide construction described above. In connection with this drop and slide for the caps 120, the overlap between cap 120 and left end cap 122, along with the overlap between adjacent caps 12, provided by shiplap joint is formed. Then, the right end cap 124 is dropped into place on the top edge of the panels 112, 114. This will also form an overlap using the shiplap joint between the right-most cap 12 and the right end cap 124. Screws are then used to secure the free ends of the caps 120, 122, 124 to the wall support track 118. Lastly, screws with the joiner plates 123 are used to secure cap-to-cap connection across each shiplap joint.

Figure 9A:
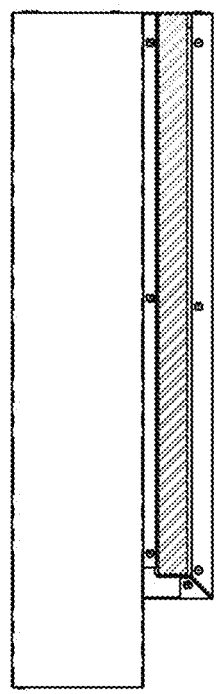
Figure 9D:
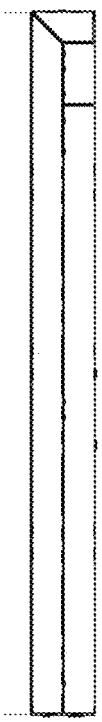
Figure 9B:
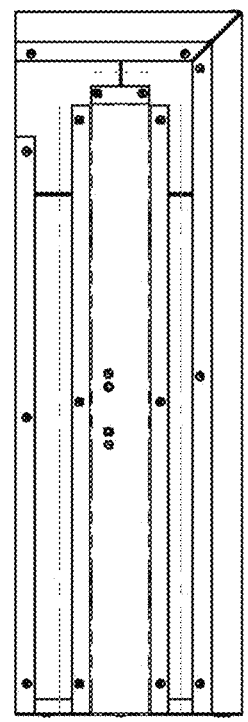
Figure 9C:
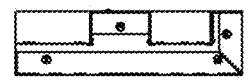
Figure 9A:
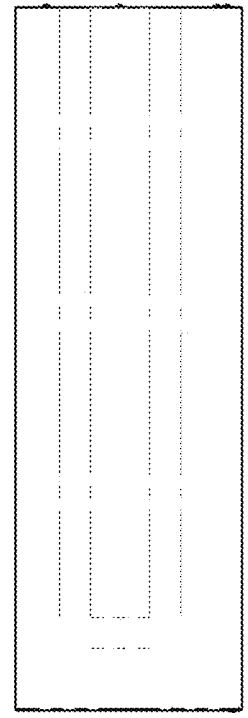

FIGS. 9AL-9FL show views corresponding to the views of FIGS. 8A-8F, for the left end cap 122. Similarly, FIGS. 9AR-9FR show corresponding views of the right end cap 124. It will be noted that the end caps 122 and 124 also include the groove 402. However, the grooves 402 for the end caps 122, 124 do not support the panel lock mechanism 214. Locking of the end caps 122 is accomplished using the screw attachment of their free ends to the wall support track 118 along with the cap-to-cap connection across their shiplap joints using the joiner plate 123.

Figure 9F:
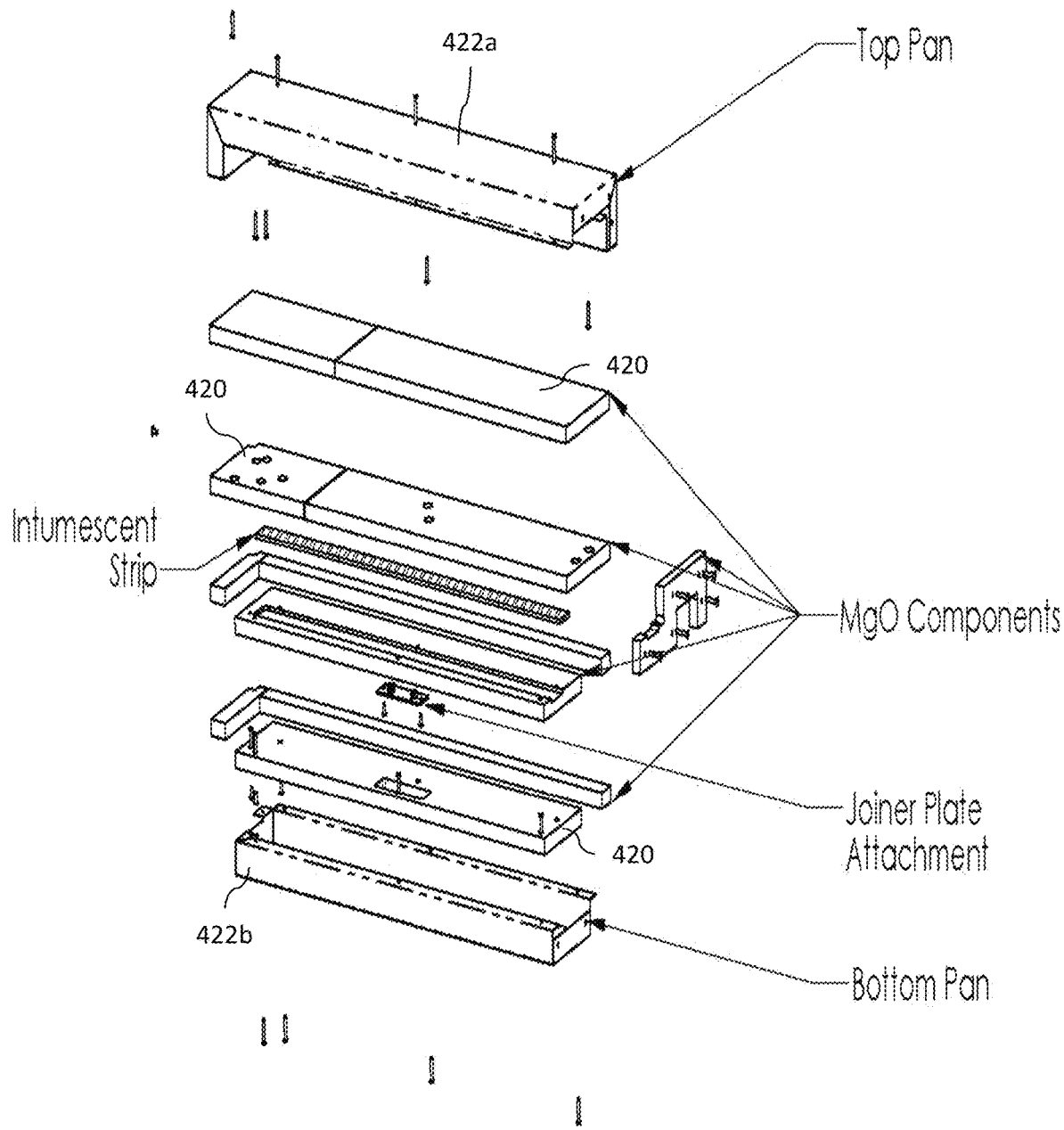
Figure 9F:
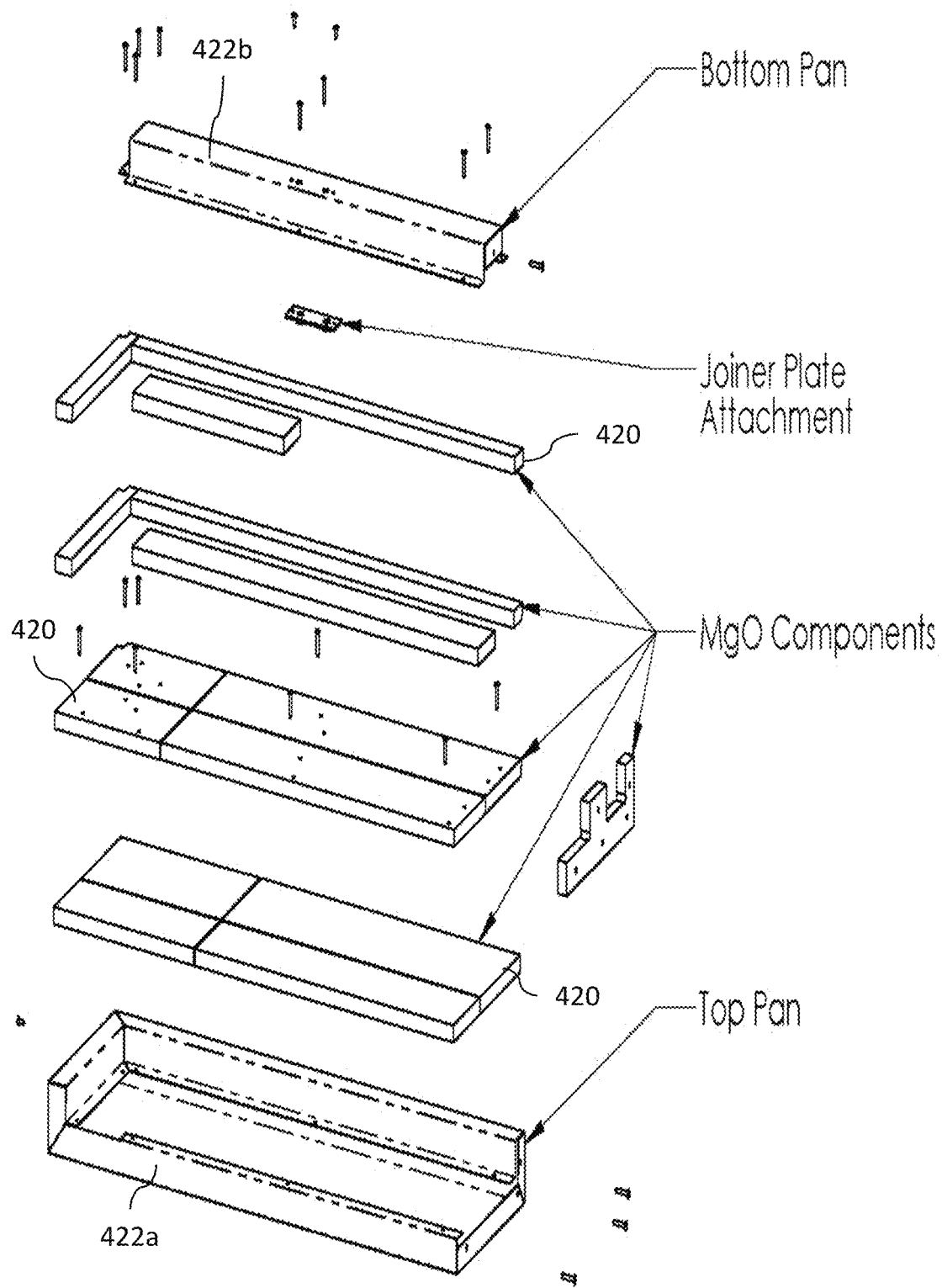

The construction of the end caps 122, 124 is similar to that of the flat cap 120. The end caps 122, 124 are formed by core comprising a plurality of layers 420 of MgO sheet material and an MgO end piece. The core is encased between an upper pan 422a and a lower pan 422b made of sheet metal (for example, galvanized steel). It will be noted that the pans 422 are shaped to wrap around the sides of the cap 120. Rivets (shown in FIGS. 9FL and 9FR) are used to secure the core between the pans 422a and 422b. A reinforced hardware plate (joiner plate attachment) 426 is provided in the construction to support mounting of the joiner plate 123 to secure adjacent caps 120, 122, 124 to each other. As shown in FIGS. 8B and 9B, openings 440 are provided in the pan 422b to access the plate 426. The screws extend through the openings 440 to engage a correspondingly threaded opening in the plate 426 for securing the joiner plate 123.

Reference is now made to FIGS. 10A and 10B which show top and cross sectional views, respectively, of the support track 118. The support track 118 is formed by a sheet bent to an L-shaped angle. The vertical leg of the track 118 is configured to be attached to the wall of the space. The horizontal leg of the track includes openings through which screws may be inserted to engage with the bottom surface of the caps 120, 122, 124A. A strip 416 of intumescent material is attached to an upper surface of the horizontal leg.

Reference is now made to FIGS. 12A-12E which show views of an alternative embodiment for the cap 120' of the temporary barrier. FIG. 12A shows a perspective view of the cap 120' from the underside. FIG. 12B shows a bottom view of the cap 120'. FIG. 12C shows a cross-sectional view of the cap 120' taken along line B-B. FIG. 12D shows a side view looking towards the free end of the cap 120. FIG. 12E show shows a side looking towards a lateral edge of the cap 120. The cap 120' primarily differs from the cap 120 in that a tongue and groove joint is used in place of the shiplap joint between adjacent caps in the modular ceiling assembly. The caps 120 and 120' share in common a construction utilizing an MgO core (using a plurality of material layers) and outer skin formed by pans. The components are secured using rivets. The groove 402 for the caps 120 and 120' further share using of the panel lock mechanism 214.

Reference is now made to FIG. 13 which illustrates a further alternative for cap-to-cap interconnection using a joint that is a combination of a tongue and groove and shiplap. This construction could be using on the lateral edges of caps 120, 122 and 124.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A barrier system for partitioning a space, comprising:
   a plurality of interlocking panels forming a modular wall;
   wherein the interlocking panels are assembled laterally adjacent to each other in the modular wall;
   wherein a connection of laterally adjacent interlocking panels in the modular wall is made through a joint formed by a first tongue and groove assembly; and
   a plurality of cap panels forming a modular ceiling;
   wherein the cap panels are assembled laterally adjacent to each other in the modular ceiling;
   wherein a connection of the cap panels of the modular ceiling to the interlocking panels of the modular wall is made through a joint formed by a second tongue and groove assembly;
   wherein each cap panel comprises a groove extending adjacent a first edge of the cap panel, wherein said groove is configured to engage with a tongue provided on the top edge of the interlocking panel; and
   wherein each cap panel further includes:
   a further tongue at a second edge of the cap panel which extends perpendicular to the first edge of the cap panel; and
   a further groove a third edge of the cap panel which extends perpendicular to the first edge of the cap panel.

2. The barrier system of claim 1, wherein the first tongue and groove assembly comprises:
   on a first interlocking panel, a latch plate and a connector mounted to the latch plate which includes a head; and
   on a second interlocking panel, a strike plate including a slot with an end having a wider opening configured to receive the head and a middle having a narrower opening configured to engage the head.

3. The barrier system of claim 1, wherein the second tongue and groove assembly comprises:

on a cap panel, a latch plate and a connector mounted to the latch plate which includes a head; and
on the interlocking panel, a strike plate including a slot with an end having a wider opening configured to receive the head and a middle having a narrower opening configured to engage the head.

4. The barrier system of claim 1, wherein each cap panel comprises:
a core made of MgO material; and
opposed steel side faces encasing the core.

5. The barrier system of claim 4, wherein the core is formed by a plurality of MgO sheets.

6. The barrier system of claim 1, wherein the laterally adjacent assembly of cap panels to each other in the modular ceiling is provided by inserting the further tongue at the second edge of one cap panel into the further groove at the third edge of another cap panel.

7. The barrier system of claim 6, further comprising a strip of intumescent material secured in the further groove.

8. The barrier system of claim 1, further comprising a wall support track configured to be mounted to a wall, and wherein the wall support track includes a surface configure to support an edge of the cap panel.

9. The barrier system of claim 8, wherein a strip of intumescent material is mounted to said surface of the wall support track.

10. A The barrier system for partitioning a space, comprising:
a plurality of interlocking panels forming a modular wall;
wherein the interlocking panels are assembled laterally adjacent to each other in the modular wall;
wherein a connection of laterally adjacent interlocking panels in the modular wall is made through a joint formed by a first tongue and groove assembly; and
a plurality of cap panels forming a modular ceiling;
wherein the cap panels are assembled laterally adjacent to each other in the modular ceiling;
wherein a connection of the cap panels of the modular ceiling to the interlocking panels of the modular wall is made through a joint formed by a second tongue and groove assembly;
wherein each cap panel comprises a groove extending adjacent a first edge of the cap panel, wherein said groove is configured to engage with a tongue provided on the top edge of the interlocking panel; and
wherein each cap panel further includes:
a first side recess in an upper surface at a second edge of the cap panel which extends perpendicular to the first edge of the cap panel; and
a second side recess in a lower surface at a third edge of the cap panel which extends perpendicular to the first edge of the cap panel.

11. The barrier system of claim 10, wherein the laterally adjacent assembly of cap panels to each other in the modular ceiling is provided by a shiplap joint formed by a first half lap at the first side recess of one cap panel and a second half lap form by the second side recess of another cap panel.

12. The barrier system of claim 11, further comprising a joiner plate secured to said one cap panel and said another cap panel across the shiplap joint.

13. The barrier system of claim 10, further comprising:
a groove in a bottom of one of said first and second side recesses; and
a strip of intumescent material secured in the groove.

14. A barrier system for partitioning a space, comprising:
a plurality of interlocking panels forming a modular wall;
wherein the interlocking panels are assembled laterally adjacent to each other in the modular wall;
wherein a connection of laterally adjacent interlocking panels in the modular wall is made through a joint formed by a tongue and groove assembly; and
a plurality of cap panels forming a modular ceiling mounted to the interlocking panels of the modular wall;
wherein the cap panels are assembled laterally adjacent to each other in the modular ceiling;
wherein a connection between two laterally adjacent cap panels of the modular ceiling is made through a shiplap joint; and
wherein each cap panel comprises a groove extending adjacent a first edge of the cap panel, wherein said groove is configured to engage with a tongue provided on the top edge of the interlocking panel.

15. The barrier system of claim 14, wherein the tongue and groove assembly comprises:
on a first interlocking panel, a latch plate and a connector mounted to the latch plate which includes a head; and
on a second interlocking panel, a strike plate including a slot with an end having a wider opening configured to receive the head and a middle having a narrower opening configured to engage the head.

16. The barrier system of claim 14, wherein each cap panel comprises:
a core made of MgO material; and
opposed steel side faces encasing the core.

17. The barrier system of claim 16, wherein the core is formed by a plurality of MgO sheets.

18. The barrier system of claim 14, further comprising a joiner plate secured between said two laterally adjacent cap panels across the shiplap joint.

19. The barrier system of claim 14, further comprising a wall support track configured to be mounted to a wall, and wherein the wall support track includes a surface configure to support a rear edge of the cap panel.

20. The barrier system of claim 19, wherein a strip of intumescent material is mounted to said surface of the wall support track.

21. A barrier system for partitioning a space, comprising:
a plurality of interlocking panels forming a modular wall;
wherein the interlocking panels are assembled laterally adjacent to each other in the modular wall;
wherein a connection of laterally adjacent interlocking panels in the modular wall is made through a joint formed by a tongue and groove assembly; and
a plurality of cap panels forming a modular ceiling mounted to the interlocking panels of the modular wall;
wherein the cap panels are assembled laterally adjacent to each other in the modular ceiling;
wherein a connection between two laterally adjacent cap panels of the modular ceiling is made through a shiplap joint; and
wherein each cap panel further includes:
a first side recess in an upper surface at one lateral edge of the cap panel to form a first half lap for the shiplap joint; and
a second side recess in a lower surface at another lateral edge of the cap panel to form a second half lap for the shiplap joint.

22. The barrier system of claim 21, further comprising:
a groove in a bottom of one of said first and second side recesses; and
a strip of intumescent material secured in the groove.

* * * * *